United States Patent
Parchment et al.

(10) Patent No.: US 9,721,304 B1
(45) Date of Patent: Aug. 1, 2017

(54) VEHICLE DAMAGE ASSESSMENT USING 3D SCANNING

(71) Applicant: Liberty Mutual Insurance Company, Boston, MA (US)

(72) Inventors: David Antony Parchment, Boston, MA (US); Khamla Saenglongma, Boston, MA (US); Gary Ellis Hall, Boston, MA (US); Normand Francis Olean, Jr., Boston, MA (US); John Heveran, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 454 days.

(21) Appl. No.: 14/332,173

(22) Filed: Jul. 15, 2014

Related U.S. Application Data

(60) Provisional application No. 61/846,466, filed on Jul. 15, 2013, provisional application No. 61/939,447, filed on Feb. 13, 2014.

(51) Int. Cl.
- *G06Q 40/08* (2012.01)
- *H04W 4/16* (2009.01)
- *H04L 29/08* (2006.01)

(52) U.S. Cl.
CPC ............ *G06Q 40/08* (2013.01); *H04L 67/12* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 5,377,098 A | 12/1994 | Sakai | |
| 5,726,705 A * | 3/1998 | Imanishi | G01N 21/8806 348/92 |
| 7,376,492 B2 * | 5/2008 | Srack | G01B 5/0025 33/288 |
| 8,015,036 B1 | 9/2011 | Leisure | |
| 2002/0001029 A1 * | 1/2002 | Abe | G01B 11/2509 348/49 |
| 2002/0035488 A1 * | 3/2002 | Aquila | G06Q 40/02 705/4 |
| 2002/0055861 A1 | 5/2002 | King | |
| 2002/0099527 A1 * | 7/2002 | Bomar, Jr. | G06Q 99/00 703/8 |

(Continued)

FOREIGN PATENT DOCUMENTS

| | | |
|---|---|---|
| EP | 0644501 A1 | 3/1995 |
| JP | 9-81739 A | 3/1997 |
| WO | 2013/159178 A1 | 10/2013 |

OTHER PUBLICATIONS

US 7,970,635, 06/2011, Medina, III (withdrawn)

*Primary Examiner* — Tsung-Yin Tsai
(74) *Attorney, Agent, or Firm* — Christensen O'Connor Johnson Kindness PLLC

(57) ABSTRACT

Automated claims adjustment is engineered to receive submission of two-dimensional data or three-dimensional data from a structured-light scan and other pieces of information directly via a mobile device. Upon receiving sufficient information to open a claim, automated claims adjustment and settlement processes are executed aiding and guiding a claimant. This reduces the time involved by the claimant in waiting for a claims adjuster to manually review a specific case file.

16 Claims, 28 Drawing Sheets

(56) References Cited

U.S. PATENT DOCUMENTS

| | | |
|---|---|---|
| 2003/0200123 A1 | 10/2003 | Burge |
| 2004/0148188 A1* | 7/2004 | Uegaki ................. G06Q 10/06 |
| | | 705/305 |
| 2004/0148204 A1 | 7/2004 | Menendez |
| 2005/0125119 A1 | 6/2005 | Srack |
| 2007/0100669 A1 | 5/2007 | Wargin |
| 2007/0136106 A1 | 6/2007 | Hart |
| 2007/0288135 A1* | 12/2007 | Kidd ................. G01M 17/0078 |
| | | 701/31.4 |
| 2008/0267487 A1 | 10/2008 | Siri |
| 2009/0002364 A1 | 1/2009 | Witte, II |
| 2009/0106052 A1 | 4/2009 | Moldovan |
| 2009/0116023 A1* | 5/2009 | Wadman ............ G01N 21/4738 |
| | | 356/446 |
| 2009/0138290 A1 | 5/2009 | Holden |
| 2010/0174564 A1 | 7/2010 | Stender |
| 2011/0218825 A1 | 9/2011 | Hertenstein |
| 2012/0057174 A1* | 3/2012 | Briggs ................. G01C 15/002 |
| | | 356/603 |
| 2012/0140041 A1 | 6/2012 | Burgunder |

\* cited by examiner

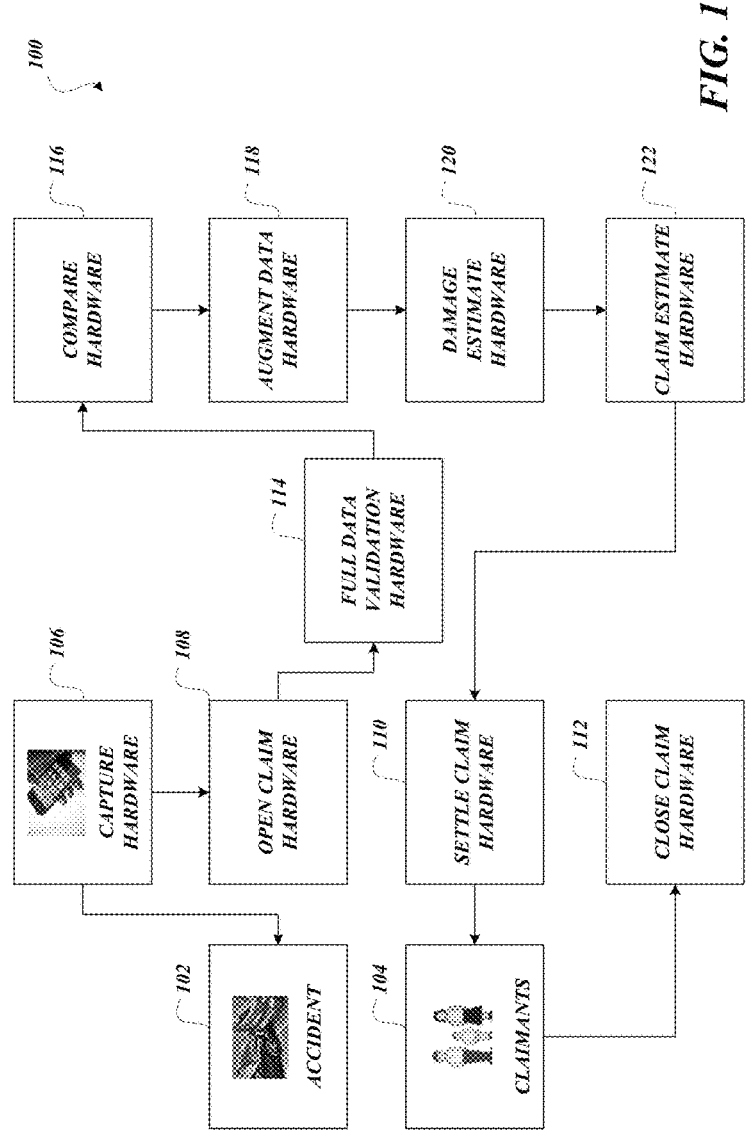

VEHICLE DAMAGE ASSESSMENT USING 3D SCANNING

CROSS-REFERENCES TO RELATED APPLICATIONS

This application claims the benefit of U.S. Provisional Application Nos. 61/846,466, filed Jul. 15, 2013, and 61/939,447, filed Feb. 13, 2014, both of which are incorporated herein by reference.

TECHNICAL FIELD

The subject matter is generally related to claims processing, and more particularly, it relates to automated claims adjustment using three-dimensional patterns.

BACKGROUND

Insurance company claims departments employ a large number of claims adjusters supported by a staff of records management and data entry clerks. Incoming claims are classified based on severity and are assigned to adjusters whose settlement authority varies with their knowledge and experience. The adjuster undertakes an investigation of each claim, usually in close cooperation with the claimant, determines if coverage is available under the terms of the insurance contract, and if so, the reasonable monetary value of the claim, and authorizes payment. Because it is labor intensive, high costs are associated with the manual claims process using human beings and the delays and/or inconsistencies that can arise from human judgment, especially when claims adjusters have varying levels of experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the subject matter includes a system form which recites a system comprising capture hardware, the structure of which is suitable for capturing telematics and structured-light data by scanning a damaged vehicle and placing data into a virtual file. The system also comprises claim estimate hardware, the structure of which is capable of estimating a claim estimate based on the captured pictorial data of the damaged vehicle and the telematics. The system further comprises settle claim hardware, the structure of which has a capacity to present the claim estimate to a claimant on his mobile device. Electronic acceptance of the claim estimate causes the settle claim hardware to settle a claim.

Another aspect of the subject matter includes a method form which recites a method comprising capturing three-dimensional data of a damaged vehicle including its telematics; opening a claim electronically and notifying a claimant on his mobile device; validating the data to decide whether to proceed with automated claims adjustment; automatically adjusting to form a claim estimate based on the data and the telematics; settling by presenting the claim estimate to the claimant on his mobile device; and closing the claim if the claimant electronically accepts the claim estimate.

An additional aspect of the subject matter includes another method form which recites a method comprising projecting light pattern on a damaged vehicle to reveal deformation of the pattern; offsetting from the light pattern, obtaining a shape of the pattern by a camera; calculating, from the shape, distance of every point in the field of view; and determining using structured-light calculation contours of the damaged vehicle.

Another aspect of the subject matter includes a computer-readable medium form which recites a computer-readable medium, which is non-transitory, having computer-executable instructions stored thereon to implement a method comprising capturing three-dimensional data of a damaged vehicle including its telematics; opening a claim electronically and notifying a claimant on his mobile device; validating the data to decide whether to proceed with automated claims adjustment; automatically adjusting to form a claim estimate based on the data and the telematics; settling by presenting the claim estimate to the claimant on his mobile device; and closing the claim if the claimant electronically accepts the claim estimate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram illustrating an archetypical system with pieces of hardware.

DETAILED DESCRIPTION

Figure 2A:
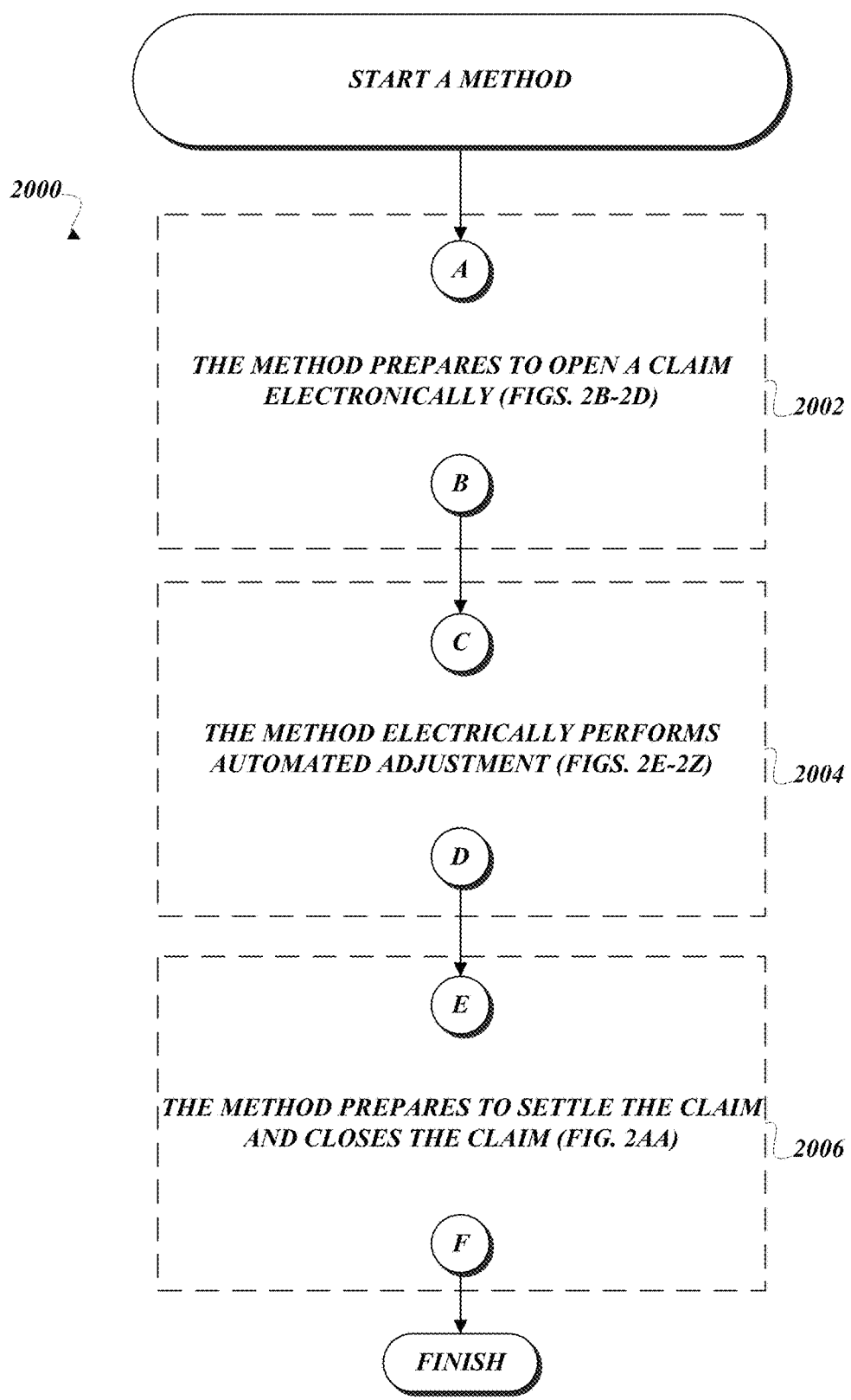
FIGS. 2A-2AA are process diagrams implementing an archetypical method for facilitating automated claims adjustments.

Various embodiments are engineered to facilitate automated claims adjustment. FIG. 1 illustrates a system 100 comprising five sub-systems that implement an automated claims adjustment system. These sub-systems have hardware structures which are suitable for receiving submission of two-dimensional data (such as photographs), three-dimensional data (such as scanned structured-light data), and other pieces of information directly via a mobile device. Upon receiving sufficient information to open a claim, the sub-systems cause the automated claims adjustment and settlement process to be executed, aiding and guiding a claimant. These sub-systems also reduce the time involved by the claimant in waiting for a claims adjuster to manually review a specific case file. The system 100 takes claims and provides resolution, allowing experienced human claims adjusters to spend their time and effort on the complex cases.

More specifically, many embodiments are engineered to reduce or eliminate the need for an experienced adjustor to personally inspect a damaged vehicle, thus increasing a claims adjuster's productivity by taking him out of the field and placing him in an oversight or review role when he is electronically intermediated. The embodiments automate and make the damage assessment and claims adjustment process more efficient and decrease the time required between assessment and payment. In some embodiments, the damage assessment and appraisal process are more accurate.

Some embodiments are engineered to use artificial intelligence emulating the knowledge and reasoning of an experienced claims adjuster so as to increase efficiency by allowing appraisals to be performed by no one or by a less knowledgeable person, thus reducing the need for the claims adjuster to be in the field and increasing the number of appraisals that he can oversee in a day. The embodiments are engineered to enhance or speed the appraisal process by identifying for the claims adjuster the damaged areas, including surface and substructures, prepopulating this information in appraisal software, and in some cases, selectively or automatically completing the appraisal process without review and generating a repair cost and time estimate.

The system 100 illustrates a scene of an accident 102 involving at least a damaged vehicle of one or more claimants 104. Using a mobile app downloadable from the system 100, the claimants 104 may use capture hardware 106, the hardware structure of which is suitable for capturing two-dimensional data or three-dimensional data of the damaged vehicle at the accident 102. In one embodiment, the capture hardware 106 includes a camera on a mobile device, the hardware of which is capable of capturing two-dimensional data, such as images or photographs.

In embodiments in which the capture hardware 106 captures three-dimensional data, the capture hardware 106 has hardware, the structure of which is suitable for three-dimensional scanning which performs multiple scans of the accident 102 including one or more damaged vehicles. In a few embodiments, the capture hardware 106 is suitable to perform structured-light scanning to project a pattern of light on a vehicle and reveal the deformation of the pattern on the vehicle. The pattern is projected onto the vehicle using either an LCD projector or other stable light source. A camera, offset slightly from the pattern projector, looks at the shape of the pattern and calculates the distance of every point in the field of view.

If the capture hardware 106 is an active device, the same structure is suitable for sending, receiving, and storing information via telecommunication. The same structure suitably has a radiation emitter. The same structure suitably has a light detector. If the capture hardware 106 is a passive device, the system 100 presents resultant passive data taken from a camera on a mobile device to a passive data database (on the mobile device or in the cloud) where these pieces of passive data are stored. Otherwise, if the resultant data is a point cloud, the system 100 presents the point cloud produced by the capture hardware 106 to a point cloud database (on the mobile device or in the cloud) where it is stored. Alignment software receives either information from the passive data database or the point cloud from the point cloud database. The alignment software is capable of aligning multiple scans to a common reference system. The alignment software then presents the registered or aligned multiple scans to reconstruction software which has the capacity to reconstruct the scene of the accident 102 including one or more damaged vehicles. This reconstruction, especially the reconstruction of the damaged vehicles, forms a part of a virtual file, the electronic records of which are used for insurance services.

In embodiments in which the capture hardware 106 captures three-dimensional data, the capture hardware 106 is a device that analyzes a real-world accident and vehicles involved to collect data on their shape and/or their appearance, including color. The collected data can then be used to construct a digital three-dimensional model of the vehicles. In some embodiments, the capture hardware 106 creates a point cloud of geometric samples on the surface of the vehicles. These cloud points can then be used to extrapolate the shape of the vehicles, which in the idiom is called reconstruction. In other embodiments, the capture hardware 106 is a passive device. Passive capture hardware 106 does not emit radiation, but instead relies on detecting reflected ambient radiation which includes visible light, although infrared could suitably be used. Each piece of the capture hardware 106 has camera-like hardware having a cone-like field of view to facilitate collection of distance information about surfaces of a vehicle. The three-dimensional data captured by the capture hardware 106 describes the distance to a surface at each point of the vehicle. In some embodiments, a single scan will not produce a complete model of the vehicle. Multiple scans, from different directions, facilitate information about all sides of the vehicle. These scans are suitably brought into a common reference system by the system 100, after which they are merged by the reconstruction software for automated claims adjustment.

The data captured by the capture hardware 106 is then forwarded to an open claim hardware 108, the hardware structure of which is capable of opening an insurance claim to investigate the extent of the damage to the damaged vehicles and the accident 102. The open claim hardware 108 presents a claim to full data validation hardware 114, the hardware structure of which has the capacity to validate data in the virtual file obtained by the open claim hardware 108 to determine whether or not automated claims adjustment is suitable. If the full data validation hardware 114 determines that the virtual file connected with the claim qualifies for automated claims adjustment, the virtual file is presented to compare hardware 116.

The compare hardware 116 has a hardware structure that is suitable for comparing the damaged vehicle and an ideal vehicle (with no damage) to determine the extent of the damage. The comparison results are then presented to augment data hardware 118, the hardware structure of which is capable of augmenting the extent of the damage with information from telematics and in-vehicle sensors. The system 100 then actuates damage estimate hardware 120, the hardware structure of which has the capacity to calculate estimates from a list of visible parts and non-visible parts, labor, and other costs connected with the damage. The estimate hardware 120 is suitable to interface with a vehicle appraisal software to generate a repair estimate. A claim estimate hardware 122 has a hardware structure which has a capacity to compute the total estimate connected with the claim. The claim estimate is then presented to settle claim hardware 110, the hardware structure of which is capable of presenting information to the claimant 104 via the mobile app on his mobile device. The settle claim hardware 110 may iterate with the claimant 104 to pick a repair schedule and terms of repairs that are acceptable to the claimant 104. After the claimant 104 accepts the settlement and/or delivery of his repaired vehicle, close claim hardware 112 presents options to the claimant 104 to intermediate a claims adjuster or it closes the claim.

Figure 2B:
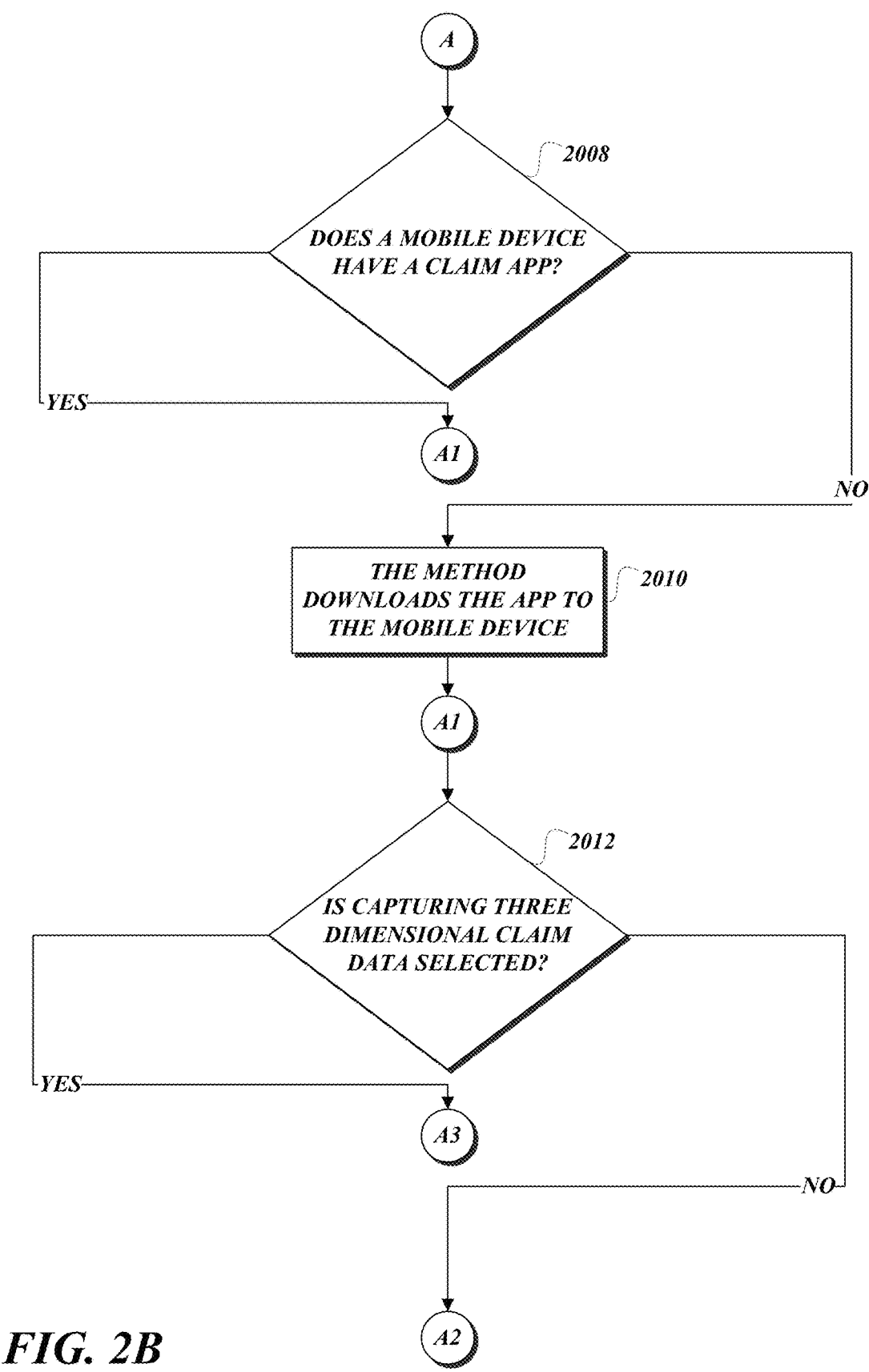

FIGS. 2A-2AA are process diagrams implementing an exemplary method 2000 for facilitating automated claims adjustments. From the start block, the method 2000 proceeds to a set of method steps 2002 defined between a continuation terminal ("terminal A") and another continuation terminal ("terminal B"). The set of method steps 2002 prepares to open a claim electronically. From terminal A (FIG. 2A), the method 2000 proceeds to decision block 2008 where a test is performed to determine whether a mobile device of the claimant has a mobile app to facilitate automated claims adjustment installed on it. If the answer to the test at decision block 2008 is YES, the method proceeds to another continuation terminal ("terminal A1"). Otherwise, if the answer to the test at decision block 2008 is NO, the method proceeds to block 2010 where the method downloads the mobile app to the mobile device. The method then continues to terminal A1. From terminal A1 (FIG. 2B), the method 2000 proceeds to decision block 2012 where a test is performed to determine whether three-dimensional claim data capturing is selected. If the answer to the test at decision block 2012 is YES, the method proceeds to another continuation terminal ("terminal A3"). Otherwise, if the answer to the test at decision block 2012 is NO, the method proceeds to another continuation terminal ("terminal A2").

Figure 2C:
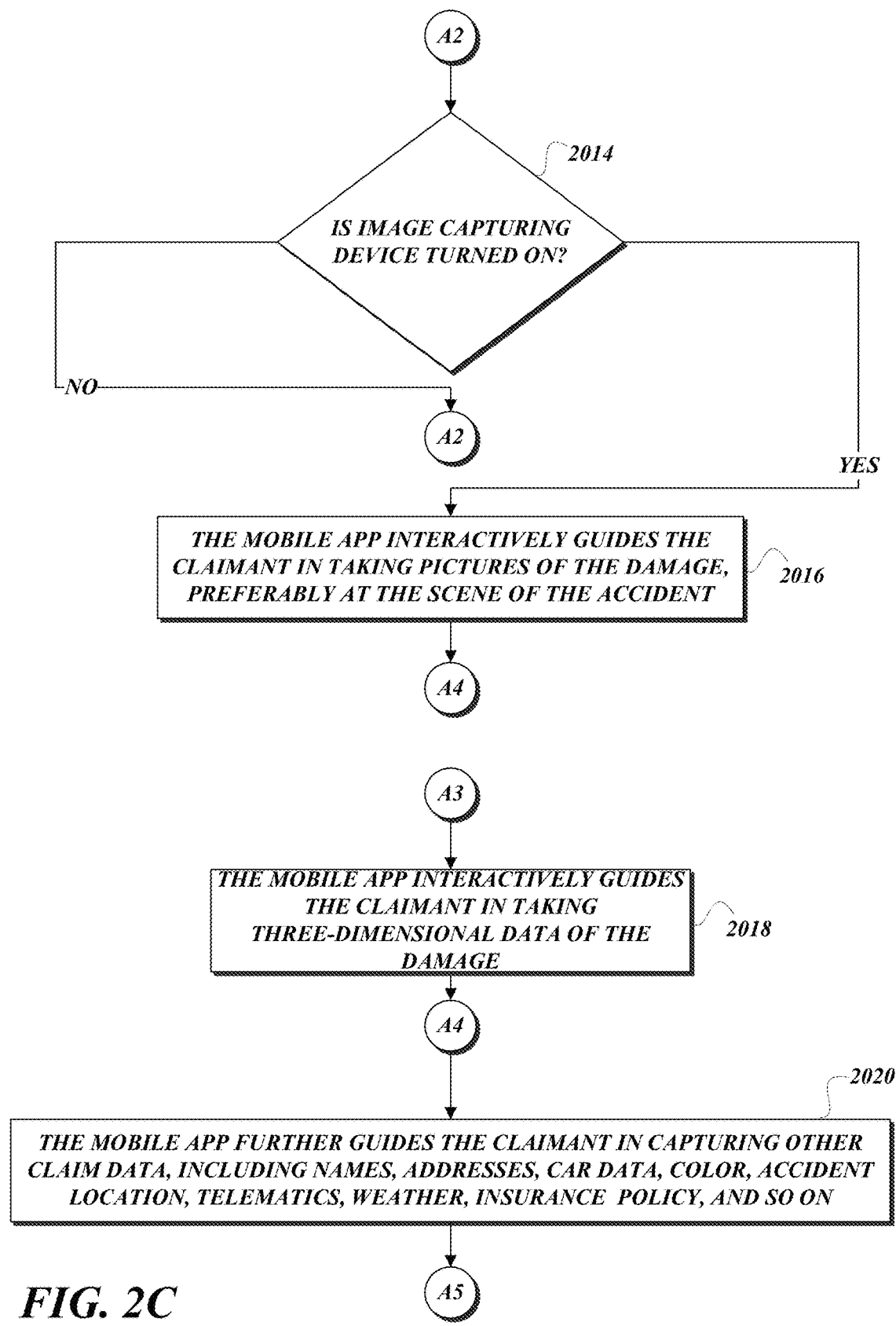

From terminal A2 (FIG. 2C), the method proceeds to decision block 2014 where a test is performed to determine whether the image capturing device is turned on. If the answer to the test at decision block 2014 is NO, the method proceeds to terminal A2 and skips back to previously discussed processing steps. Otherwise, if the answer to the test at decision block 2014 is YES, the method proceeds to block 2016 where the mobile app interactively guides the claimant in taking pictures of the damage, preferably at the scene of the accident. The method then continues to another continuation terminal ("terminal A4"). From terminal A3 (FIG. 2C), the method 2000 proceeds to block 2018 where the mobile app interactively guides the claimant in taking three-dimensional data of the damage by scanning. The method negates the need for position reference points to be placed on the surface to be scanned. The method facilitates the ability to measure deformities down to 1 mm using structured-light scanning. In many embodiments, the method need not use photographs as the definitive source for determining the extent of damage. In some embodiments, the three-dimensional data facilitates measurement of damage that is not readily discernible through photographs, such as light colored vehicles or vehicles with low degrees of surface deviation (hail damage). The method then continues to terminal A4. From terminal A4 (FIG. 2C), the method 2000 proceeds to block 2020 where the mobile app further guides the claimant in capturing other claim data, including names, addresses, car data, color, accident location, telematics, weather, insurance policy, and so on. The method then continues to another continuation terminal ("terminal A5").

Figure 2D:
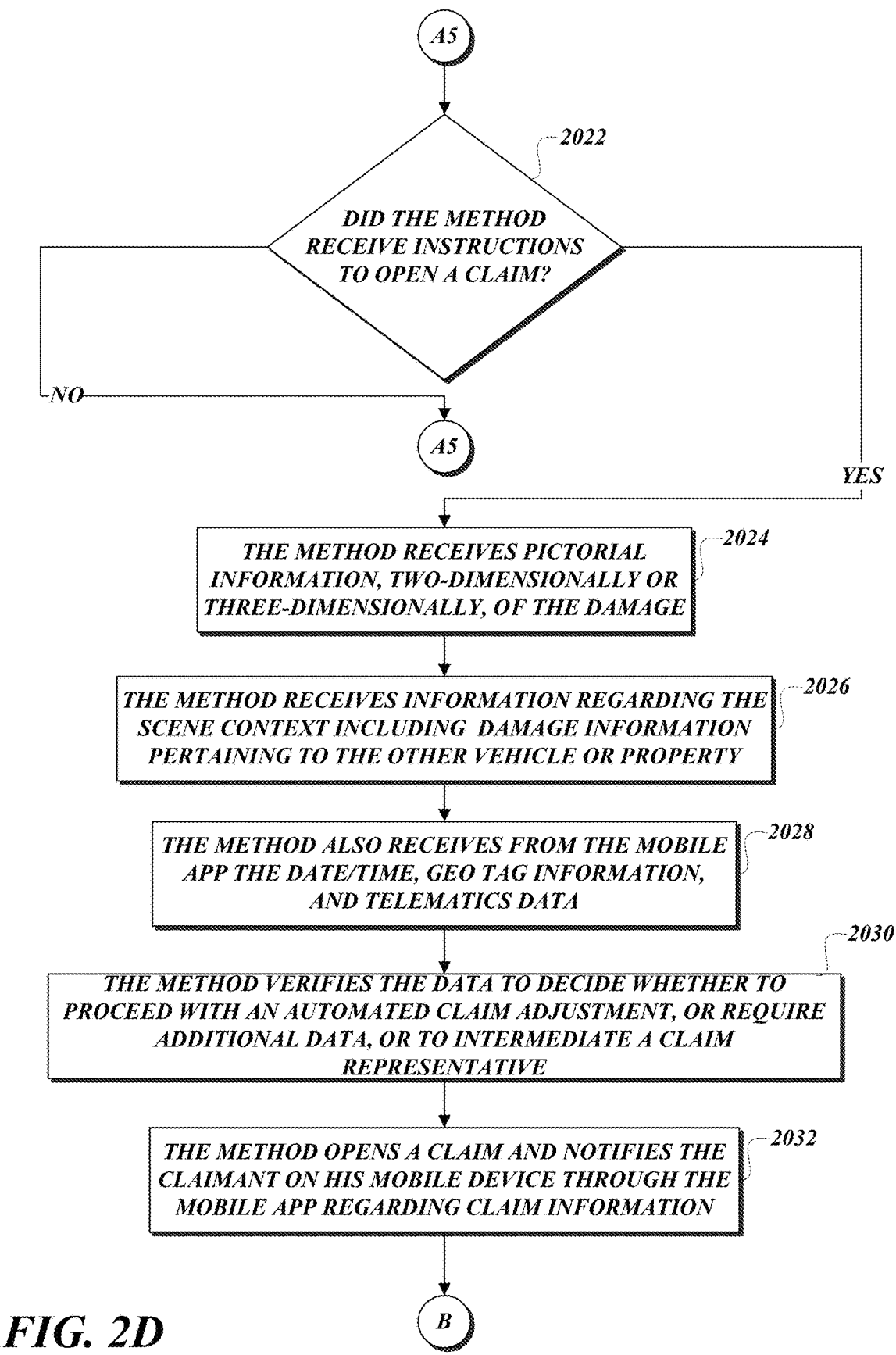

From terminal A5 (FIG. 2D), the method proceeds to decision block 2022 where a test is performed to determine whether the method received instructions to open a claim. If the answer to the test at decision block 2022 is NO, the method proceeds to terminal A5 and skips back to previously discussed processing steps. Otherwise, if the answer to the test at decision block 2022 is YES, the method proceeds to block 2024 where the method receives pictorial information, two-dimensionally or three-dimensionally, of the damage. At block 2026, the method receives information regarding the scene context including damage information pertaining to the other vehicle or property. At block 2028, the method also receives from the mobile app the date/time, geo tag information, and the telematics data. At block 2030, the method verifies the data to decide whether to proceed with an automated claim adjustment or require additional data or to intermediate a claim representative. At block 2032, the method opens a claim and notifies the claimant on his mobile device through the mobile app regarding claim information. The method then continues to terminal B.

Figure 2E:
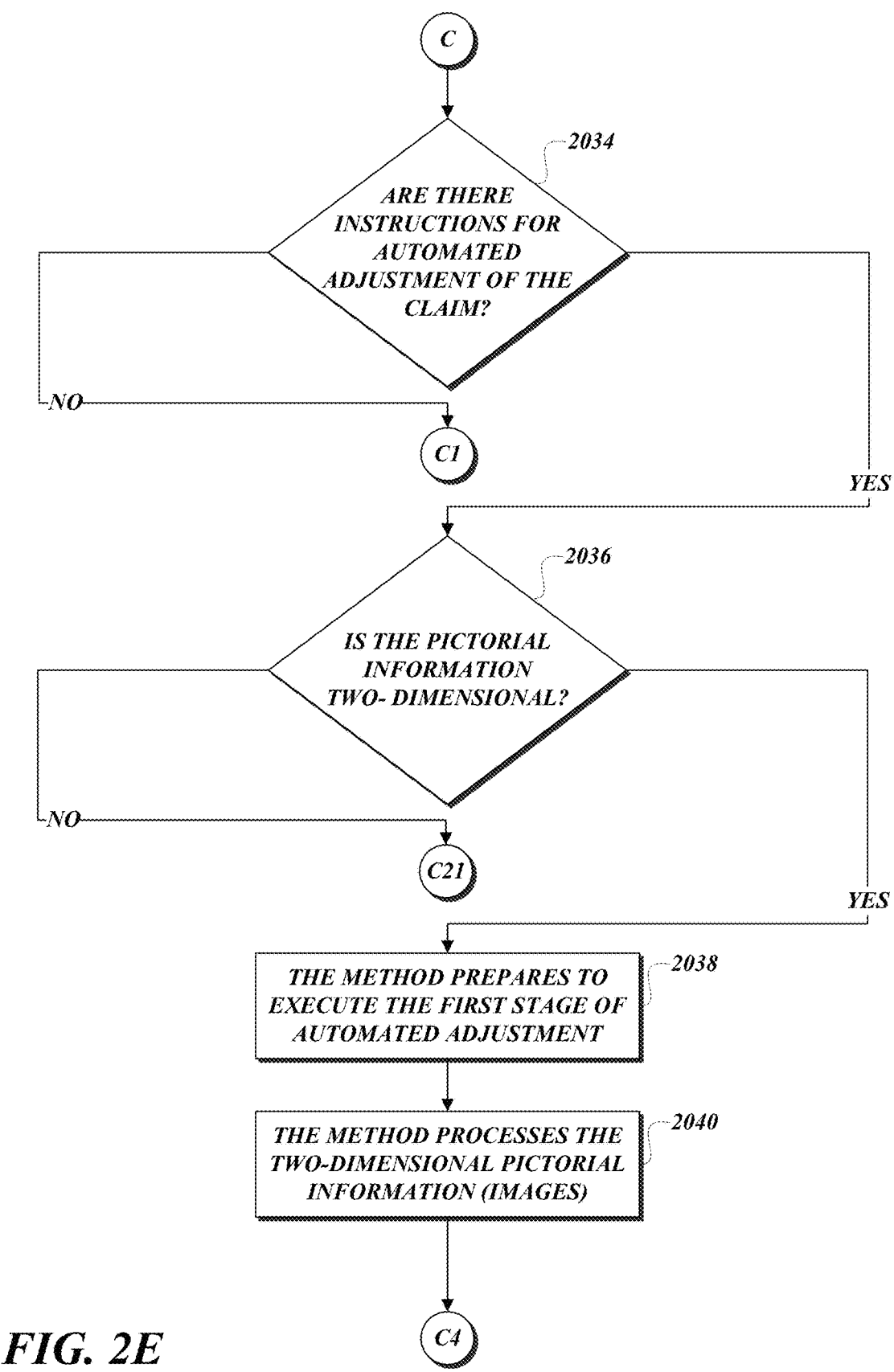

From terminal B (FIG. 2A), the method 2000 proceeds to a set of method steps 2004 defined between a continuation terminal ("terminal C") and another continuation terminal ("terminal D"). The set of method steps 2004 electronically performs automated adjustments. From terminal C (FIG. 2E), the method 2000 proceeds to decision block 2034 where a test is performed to determine whether there are instructions for automated adjustment of the claim. If the answer to the test at decision block 2034 is NO, the method proceeds to another continuation terminal ("terminal C1"). Otherwise, if the answer to the test at decision block 2034 is YES, the method proceeds to decision block 2036 where a test is performed to determine whether the pictorial information is two-dimensional. If the answer to the test at decision block 2036 is NO, the method proceeds to another continuation terminal ("terminal C21"). Otherwise, if the answer to the test at decision block 2036 is YES, the method proceeds to block 2038 where the method prepares to execute the first stage of automated adjustment. At block 2040, the method processes the two-dimensional pictorial information (photographs or images). The method then continues to another continuation terminal ("terminal C4").

Figure 2F:
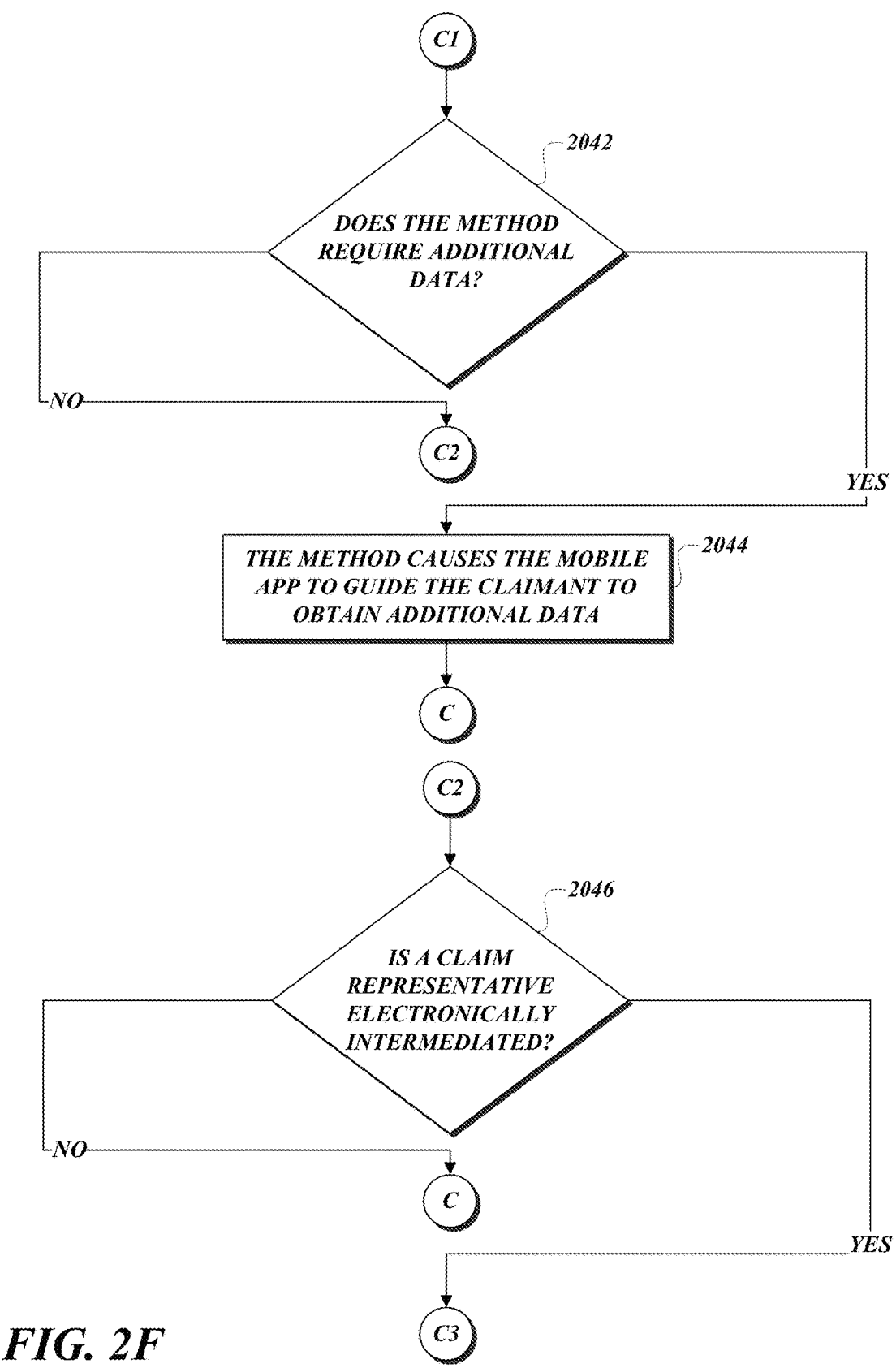

From terminal C1 (FIG. 2F), the method proceeds to decision block 2042 where a test is performed to determine whether the method requires additional data. If the answer to the test at decision block 2042 is NO, the method proceeds to another continuation terminal ("terminal C2"). Otherwise, if the answer to the test at decision block 2042 is YES, the method proceeds to block 2044 where the method causes the mobile app to guide the claimant to obtain additional data. The method then continues to terminal C and skips back to previously discussed processing steps. From terminal C2 (FIG. 2F), the method proceeds to decision block 2046 where a test is performed to determine whether a claims adjuster is electronically intermediated. If the answer to the test at decision block 2046 is NO, the method proceeds to terminal C and skips back to previously discussed processing steps. Otherwise, if the answer to the test at decision block 2046 is YES, the method proceeds to another continuation terminal ("terminal C3").

Figure 2G:
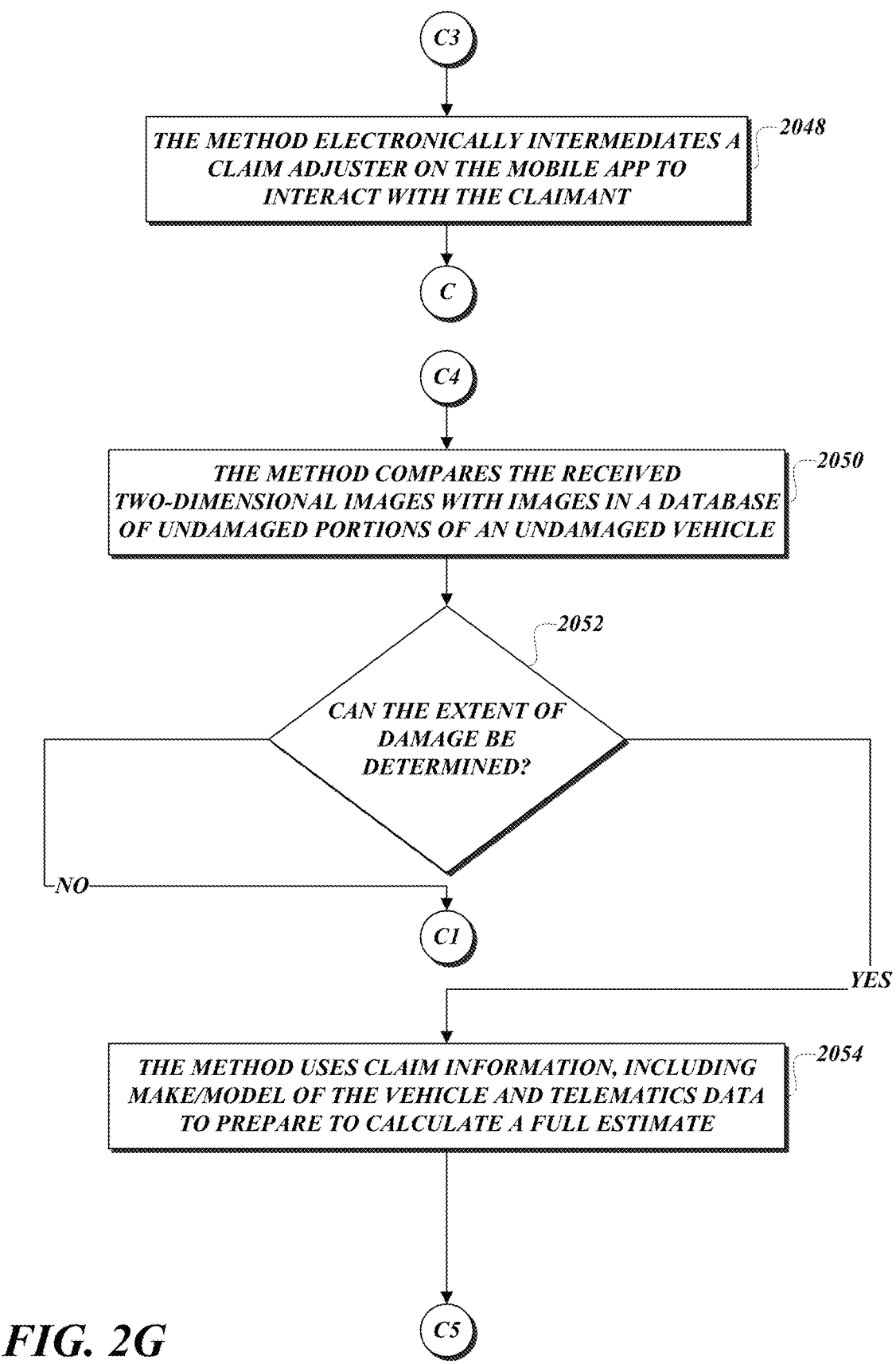

From terminal C3 (FIG. 2G), the method proceeds to block 2048 where the method electronically intermediates a claims adjuster on the mobile app to interact with the claimant. The method then continues to terminal C and skips back to previously discussed processing steps. From terminal C4 (FIG. 2G), the method proceeds to block 2050 where the method compares the received two-dimensional images with images in a database of undamaged portions of an undamaged vehicle. The method then proceeds to decision block 2052 where a test is performed to determine whether the extent of damage can be determined. If the answer to the test at decision block 2052 is NO, the method proceeds to terminal C1 and skips back to previously discussed processing steps. Otherwise, if the answer to the test at decision block 2052 is YES, the method proceeds to block 2054 where the method uses claim information, including make/model of the vehicle and telematics data to prepare to calculate a full estimate. The method then continues to another continuation terminal ("terminal C5").

Figure 2H:
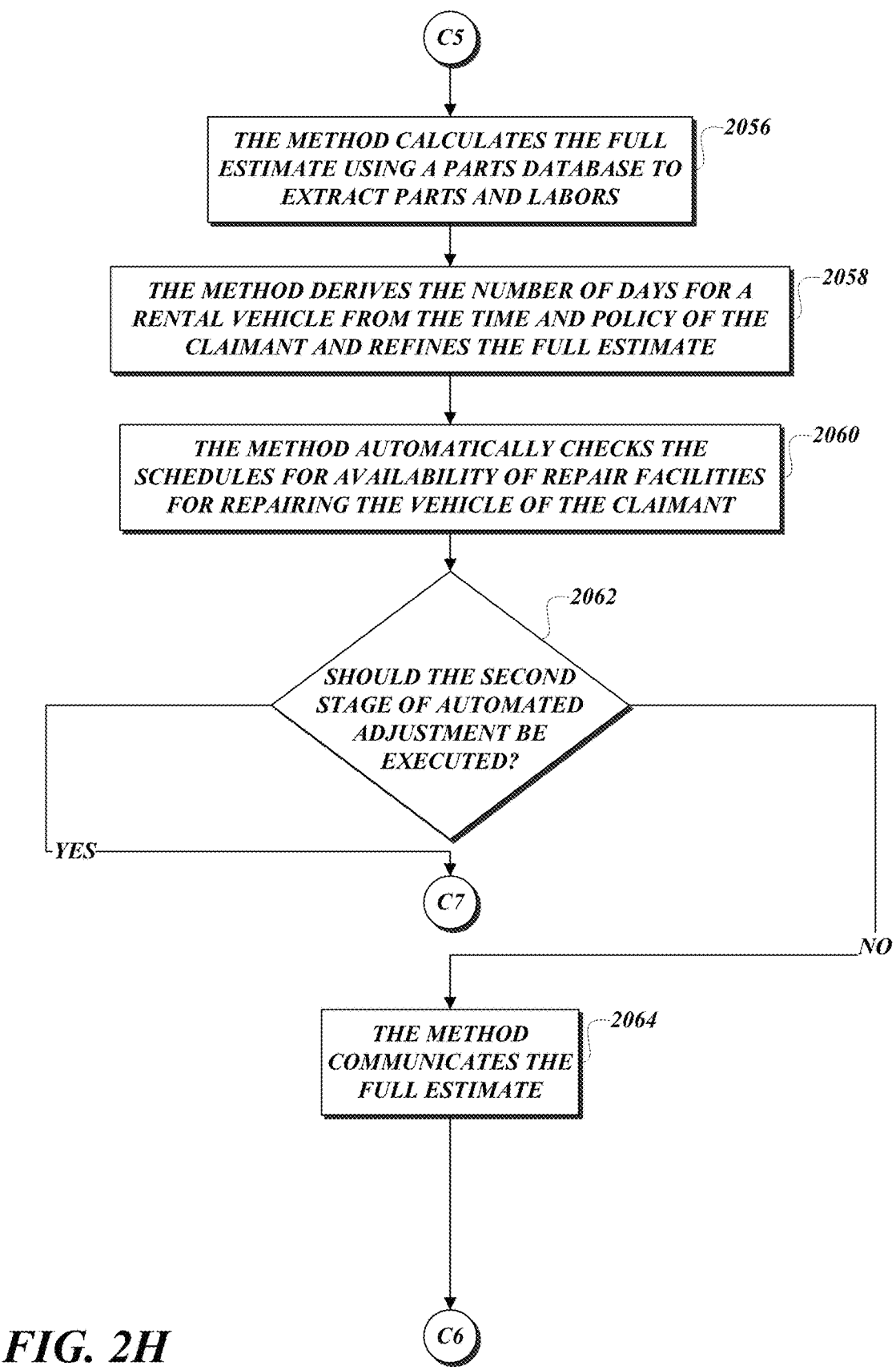

From terminal C5 (FIG. 2H), the method proceeds to block 2056 where the method calculates the full estimate using a parts database to extract parts and labor. At block 2058, the method derives the number of days for a rental vehicle from the time and policy of the claimant and refines the full estimate. At block 2060, the method automatically checks the schedules for availability of repair facilities for repairing the vehicle of the claimant. The method then continues to decision block 2062 where a test is performed to determine whether the second stage of automated adjustment should be executed. If the answer to the test at decision block 2062 is YES, the method proceeds to another continuation terminal ("terminal C7"). Otherwise, if the answer to the test at decision block 2062 is NO, the method proceeds to block 2064 where the method communicates the full estimate. The method then continues to another continuation terminal ("terminal C6").

Figure 2I:
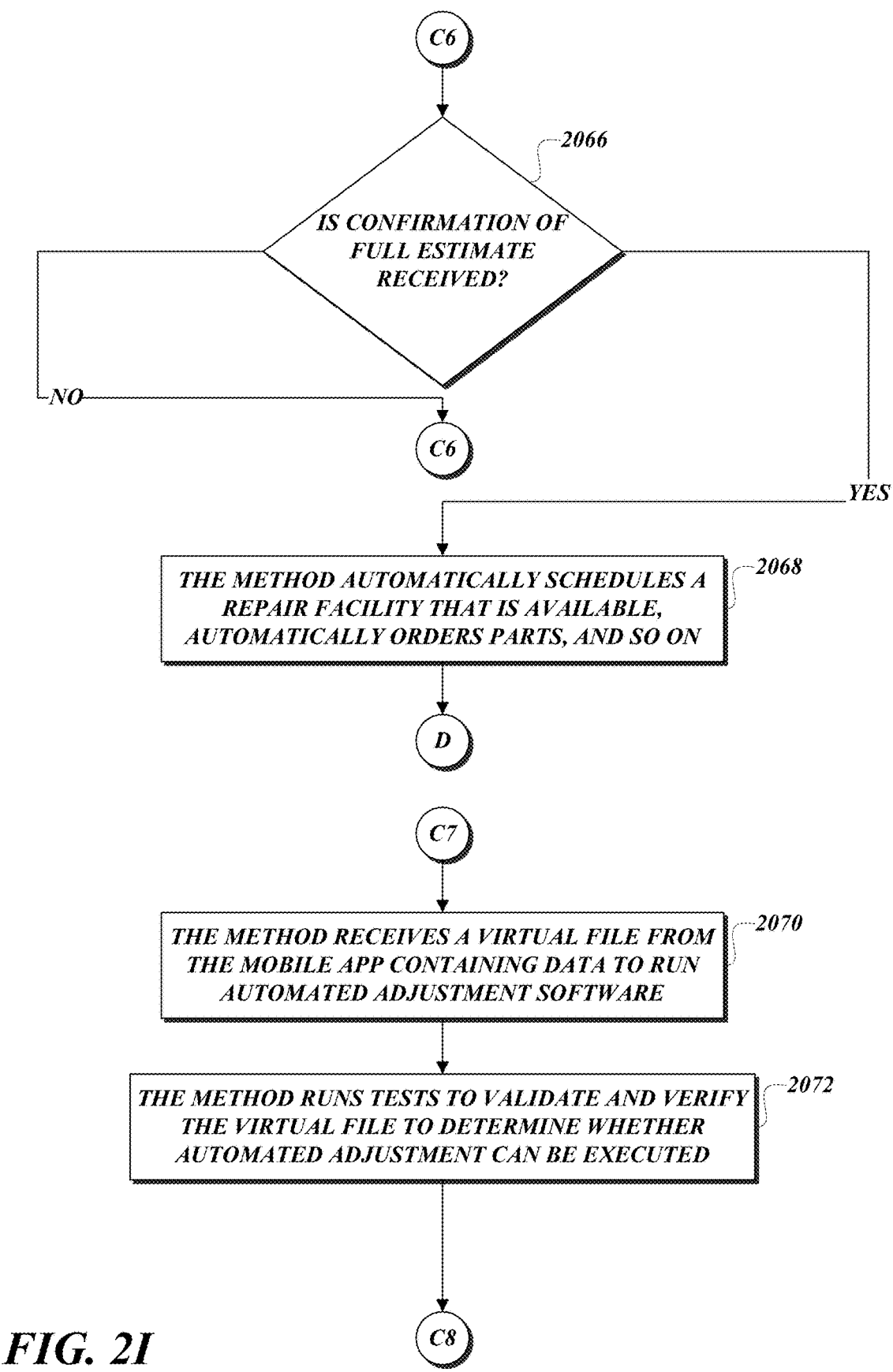

From terminal C6 (FIG. 2I), the method proceeds to decision block 2066 where a test is performed to determine whether the confirmation of the full estimate is received. If the answer to the test at decision block 2066 is NO, the method proceeds to terminal C6 and skips back to previously discussed processing steps. Otherwise, if the answer to the test at decision block 2066 is YES, the method proceeds to block 2068 where the method automatically schedules a repair facility that is available, automatically orders parts, and so on. The method then continues to terminal D. From terminal C7 (FIG. 2I), the method proceeds to block 2070 where the method receives a virtual file from the mobile app containing data to run automated claims adjustment software. At block 2072, the method runs tests to validate and verify the virtual file to determine whether automated claims adjustment can be executed. The method then continues to another continuation terminal ("terminal C8").

Figure 2J:
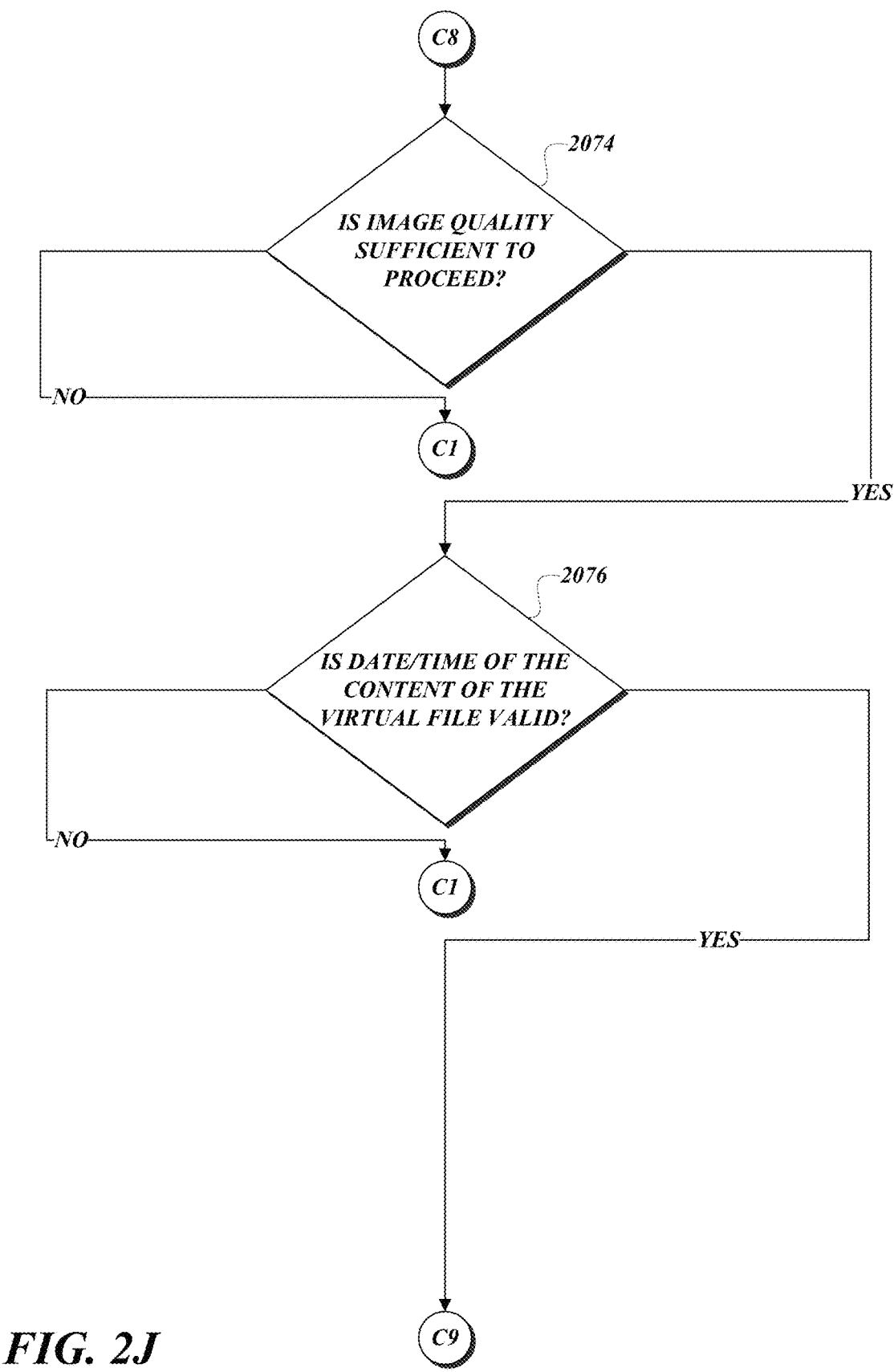

From terminal C8 (FIG. 2J), the method proceeds to decision block 2074 where a test is performed to determine whether image quality is sufficient to proceed. If the answer to the test at decision block 2074 is NO, the method proceeds to terminal C1 and skips back to previously discussed processing steps. Otherwise, if the answer to the test at decision block 2074 is YES, the method proceeds to decision block 2076 where a test is performed to determine whether the date/time of the content of the virtual file is valid. If the answer to the test at decision block 2076 is NO, the method proceeds to terminal C1 and skips back to previously discussed processing steps. Otherwise, if the answer to the test at decision block 2076 is YES, the method proceeds to another continuation terminal ("terminal C9").

Figure 2K:
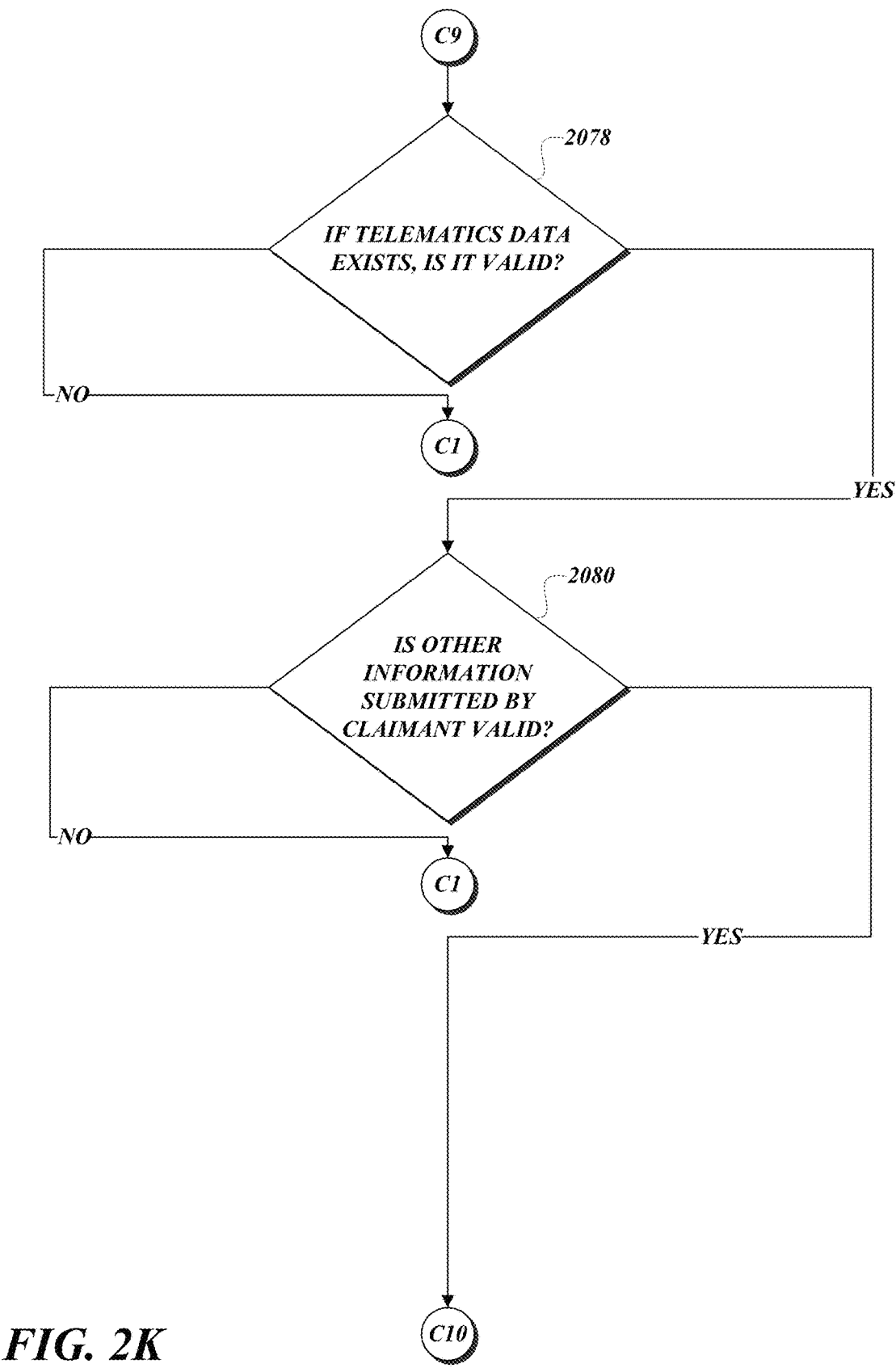

From terminal C9 (FIG. 2K), the method proceeds to decision block 2078 where a test is performed to determine whether telematics data is valid. If the answer to the test at decision block 2078 is NO, the method proceeds to terminal C1 and skips back to previously discussed processing steps. Otherwise, if the answer to the test at decision block 2078 is YES, the method proceeds to decision block 2080 where a test is performed to determine whether other information submitted by the claimant is valid. If the answer to the test at decision block 2080 is NO, the method proceeds to terminal C1 and skips back to previously discussed processing steps. Otherwise, if the answer to the test at decision block 2080 is YES, the method proceeds to another continuation terminal ("terminal C10").

Figure 2L:
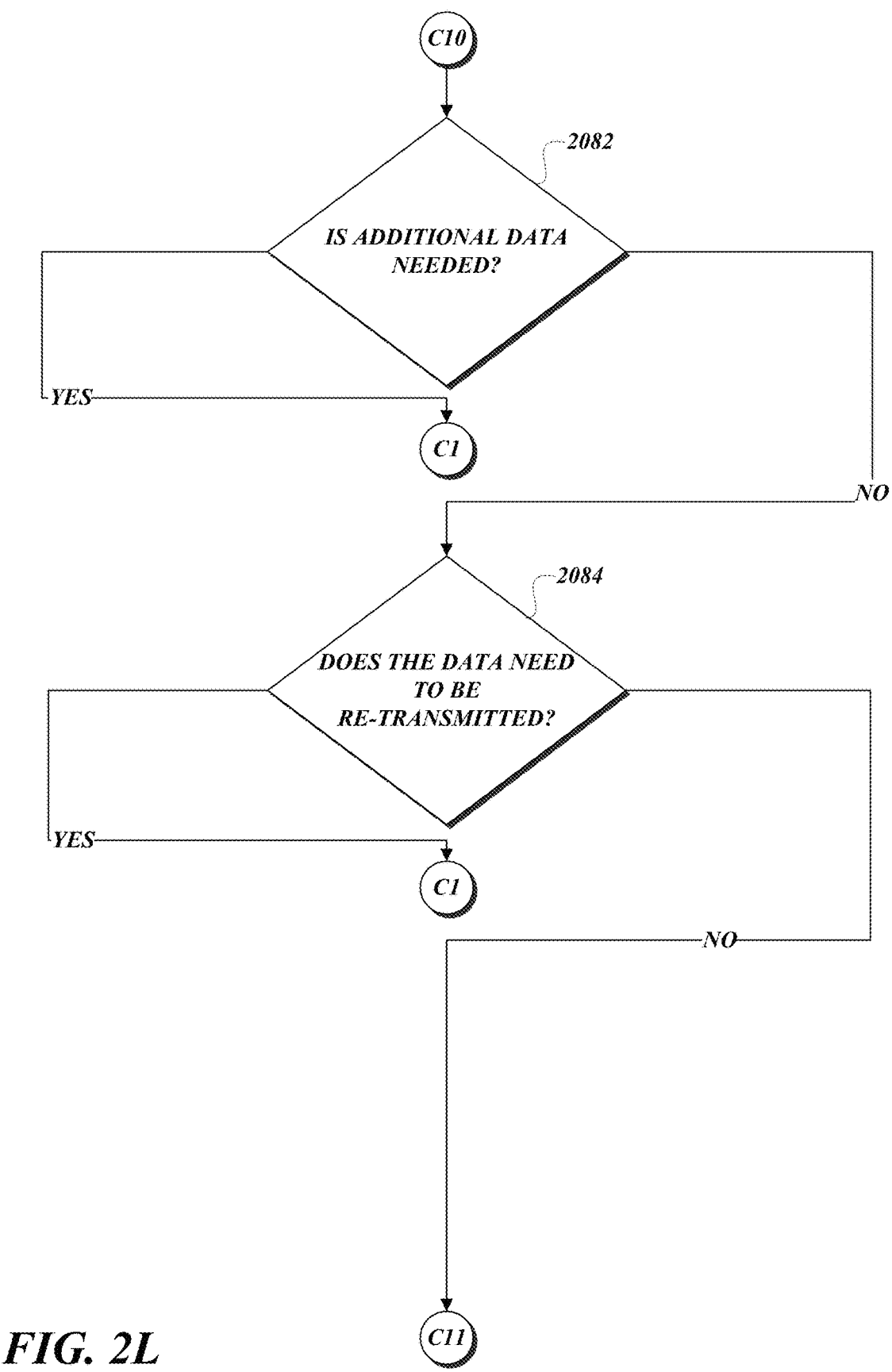

From terminal C10 (FIG. 2L), the method proceeds to decision block 2082 where a test is performed to determine whether additional data is needed. If the answer to the test at decision block 2082 is YES, the method proceeds to terminal C1 and skips back to previously discussed processing steps. Otherwise, if the answer to the test at decision block 2082 is NO, the method proceeds to decision block 2084 where a test is performed to determine whether the data needs to be re-transmitted. If the answer to the test at decision block 2084 is YES, the method proceeds to terminal C1 and skips back to previously discussed processing steps. Otherwise, if the answer to the test at decision block 2084 is NO, the method proceeds to another continuation terminal ("terminal C11").

Figure 2M:
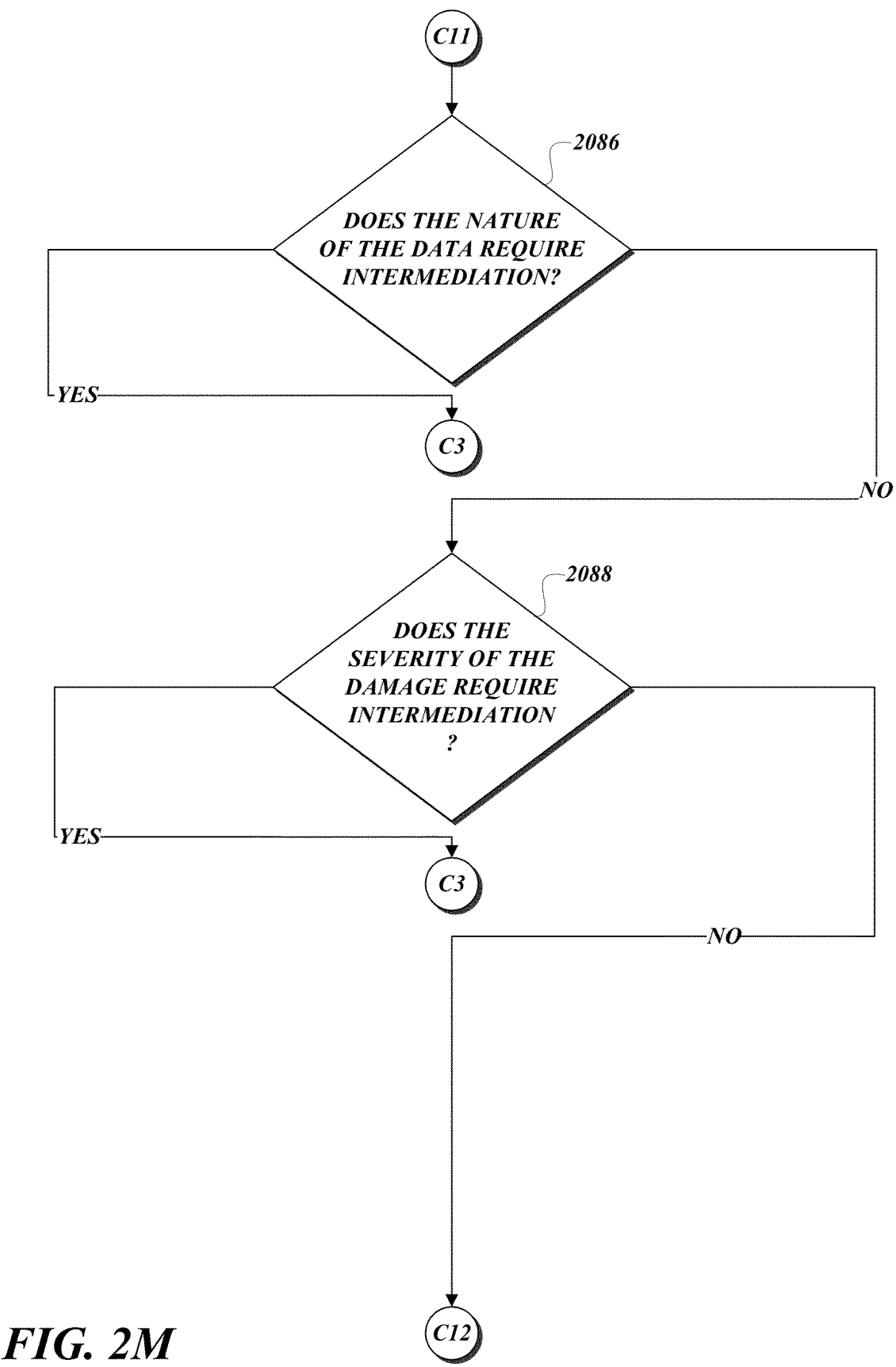

From terminal C11 (FIG. 2M), the method proceeds to decision block 2086 where a test is performed to determine whether the nature of the data requires intermediation. If the answer to the test at decision block 2086 is YES, the method proceeds to terminal C3 and skips back to previously discussed processing steps. Otherwise, if the answer to the test at decision block 2086 is NO, the method proceeds to decision block 2088 where a test is performed to determine whether the severity of the damage requires intermediation. If the answer to the test at decision block 2088 is YES, the method proceeds to terminal C3 and skips back to previously discussed processing steps. Otherwise, if the answer to the test at decision block 2088 is NO, the method proceeds to another continuation terminal ("terminal C12").

Figure 2N:
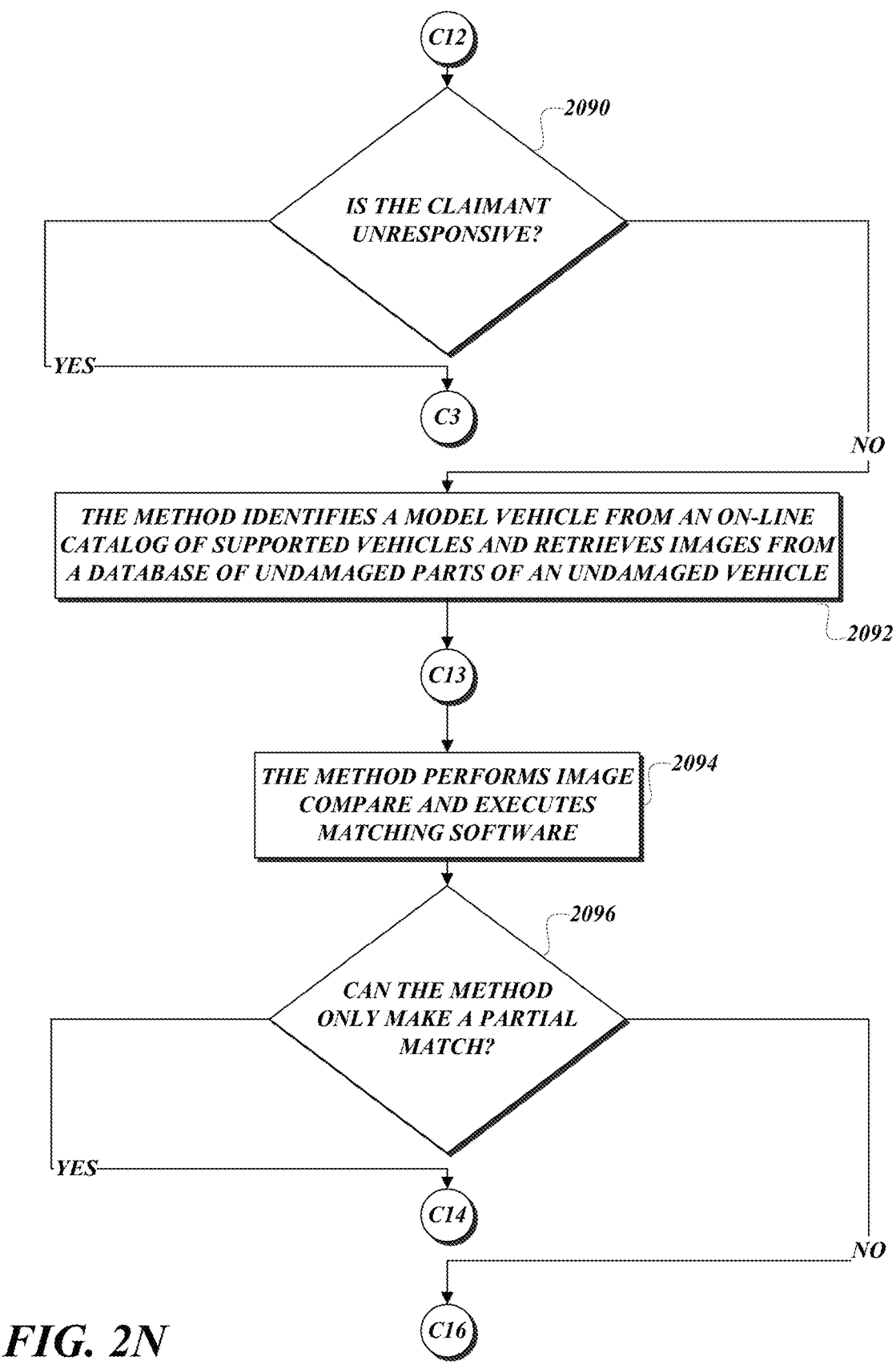
Figure 20:
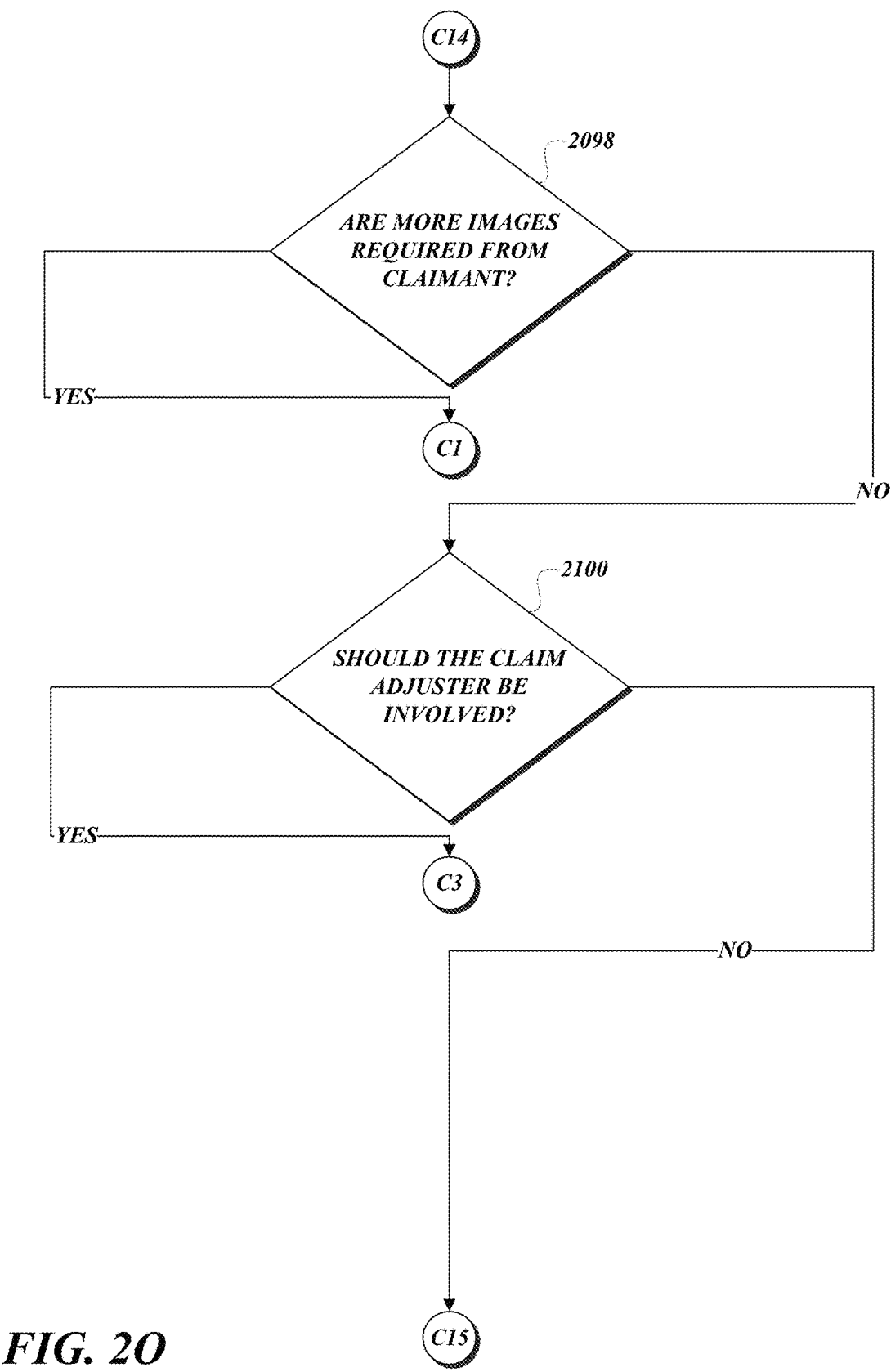

From terminal C12 (FIG. 2N), the method proceeds to decision block 2090 where a test is performed to determine whether the claimant is unresponsive. If the answer to the test at decision block 2090 is YES, the method proceeds to terminal C3 and skips back to previously discussed processing steps. Otherwise, if the answer to the test at decision block 2090 is NO, the method proceeds to block 2092 where the method identifies a model vehicle from an online catalog of supported vehicles and retrieves images from a database of undamaged parts of an undamaged vehicle. The method then continues to another continuation terminal ("terminal C13"). From terminal C13 (FIG. 2N), the method proceeds to block 2094 where the method performs image compare and executes matching software. The method then continues to decision block 2096 where a test is performed to determine whether the method can only make a partial match. If the answer to the test at decision block 2096 is YES, the method proceeds to another continuation terminal ("terminal C14"). Otherwise, if the answer to the test at decision block 2096 is NO, the method proceeds to another continuation terminal ("terminal C16").

From terminal C14 (FIG. 2O), the method proceeds to decision block 2098 where a test is performed to determine whether more images are required from the claimant. If the answer to the test at decision block 2098 is YES, the method proceeds to terminal C1 and skips back to previously discussed processing steps. Otherwise, if the answer to the test at decision block 2098 is NO, the method proceeds to decision block 2100 where a test is performed to determine whether a claim adjuster should be involved. If the answer to the test at decision block 2100 is YES, the method proceeds to terminal C3 and skips back to previously discussed processing steps. Otherwise, if the answer to the test at decision block 2100 is NO, the method proceeds to another continuation terminal ("terminal C15").

Figure 2P:
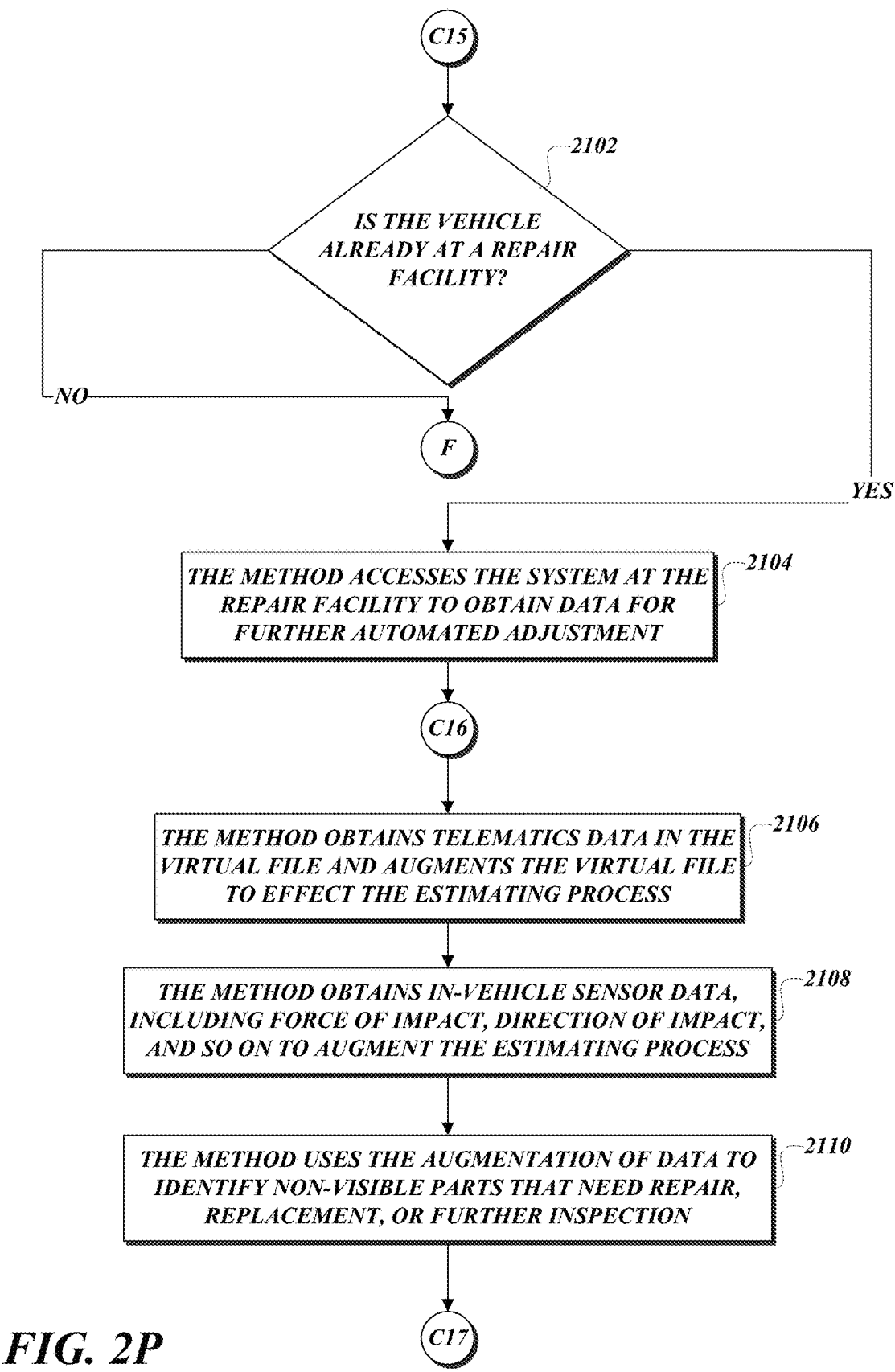

From terminal C15 (FIG. 2P), the method proceeds to decision block 2102 where a test is performed to determine whether the vehicle is already at a repair facility. If the answer to the test at decision block 2102 is NO, the method proceeds to another continuation terminal ("terminal F"). Otherwise, if the answer to the test at decision block 2102 is YES, the method proceeds to block 2104 where the method accesses the system at the repair facility to obtain data for further automated adjustment. The method then continues to another continuation terminal ("terminal C16"). From terminal C16 (FIG. 2P), the method proceeds to block 2106 where the method obtains telematics data in the virtual file and augments the virtual file to effect the estimating process. The method then continues to block 2108 where the method obtains in-vehicle sensor data, including force of impact, direction of impact, and so on, to augment the estimating process. At block 2110, the method uses the augmentation of data to identify non-visible parts that need repair replacement, or further inspection. The method then continues to another continuation terminal ("terminal C17").

Figure 2Q:
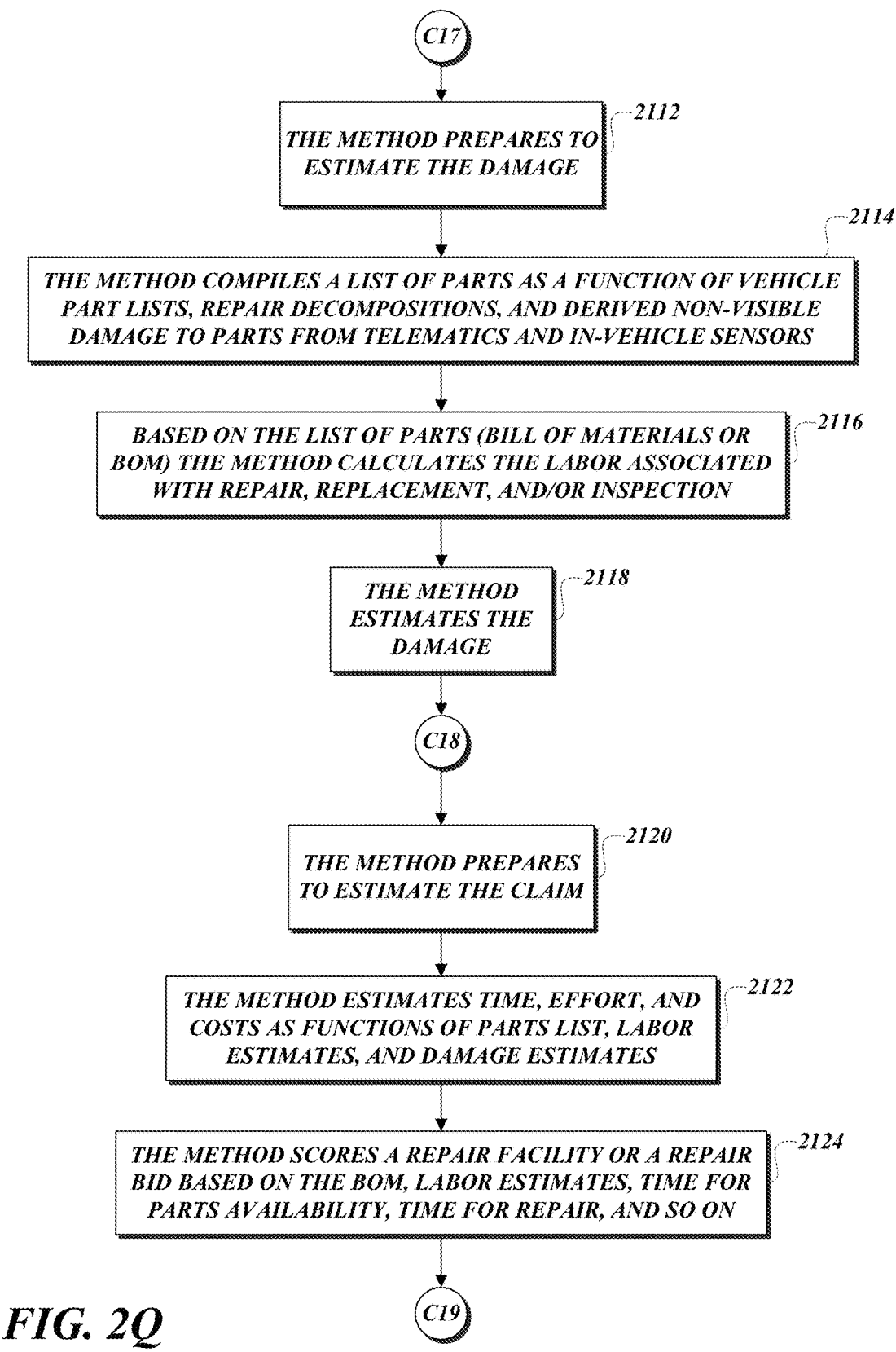

From terminal C17 (FIG. 2Q), the method proceeds to block 2112 where the method prepares to estimate the damage. At block 2114, the method compiles a list of parts as a function of vehicle part lists, repair decompositions, and derived non-visible damage to parts from telematics and in-vehicle sensors. At block 2116, based on the list of parts (bill of materials or BOM), the method calculates the labor associated with repair, replacement, and/or inspection. At block 2118, the method estimates the damage. The method then continues to another continuation terminal ("terminal C18"). At terminal C18 (FIG. 2Q), the method proceeds to block 2120 where the method prepares to estimate the claim. At block 2122, the method estimates time, effort, and costs as functions of parts list, labor estimates, and damage estimates. At block 2124, the method scores a repair facility or a repair bid based on the BOM, labor estimates, time for parts availability, time for repair, and so on. The method then continues to another continuation terminal ("terminal C19").

Figure 2R:
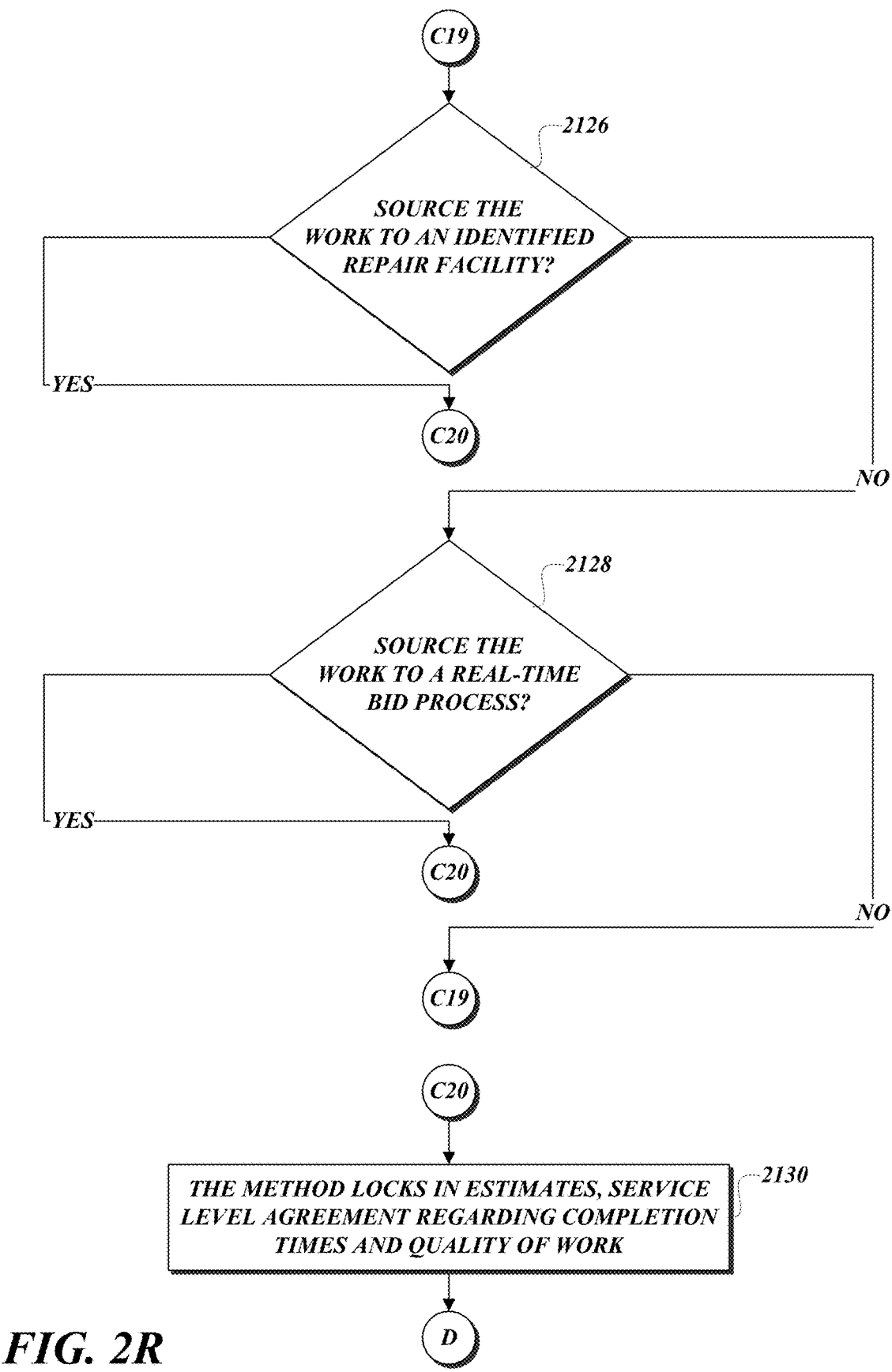

From terminal C19 (FIG. 2R), the method proceeds to decision block 2126 where a test is performed to determine whether to source the work to an identified repair facility. If the answer to the test at decision block 2126 is YES, the method proceeds to another continuation terminal ("terminal C20"). Otherwise, if the answer to the test at decision block 2126 is NO, the method proceeds to decision block 2128 where a test is performed to determine whether to source the work to a real-time bid process. If the answer to the test at decision block 2128 is YES, the method proceeds to terminal C20. Otherwise, if the answer to the test at decision block 2128 is NO, the method proceeds to terminal C19 and skips back to previously discussed processing steps. From terminal C20 (FIG. 2R), the method proceeds to block 2130 where the method locks in estimates and the service level agreement regarding completion times and quality of work. The method then continues to terminal D.

Figure 2S:
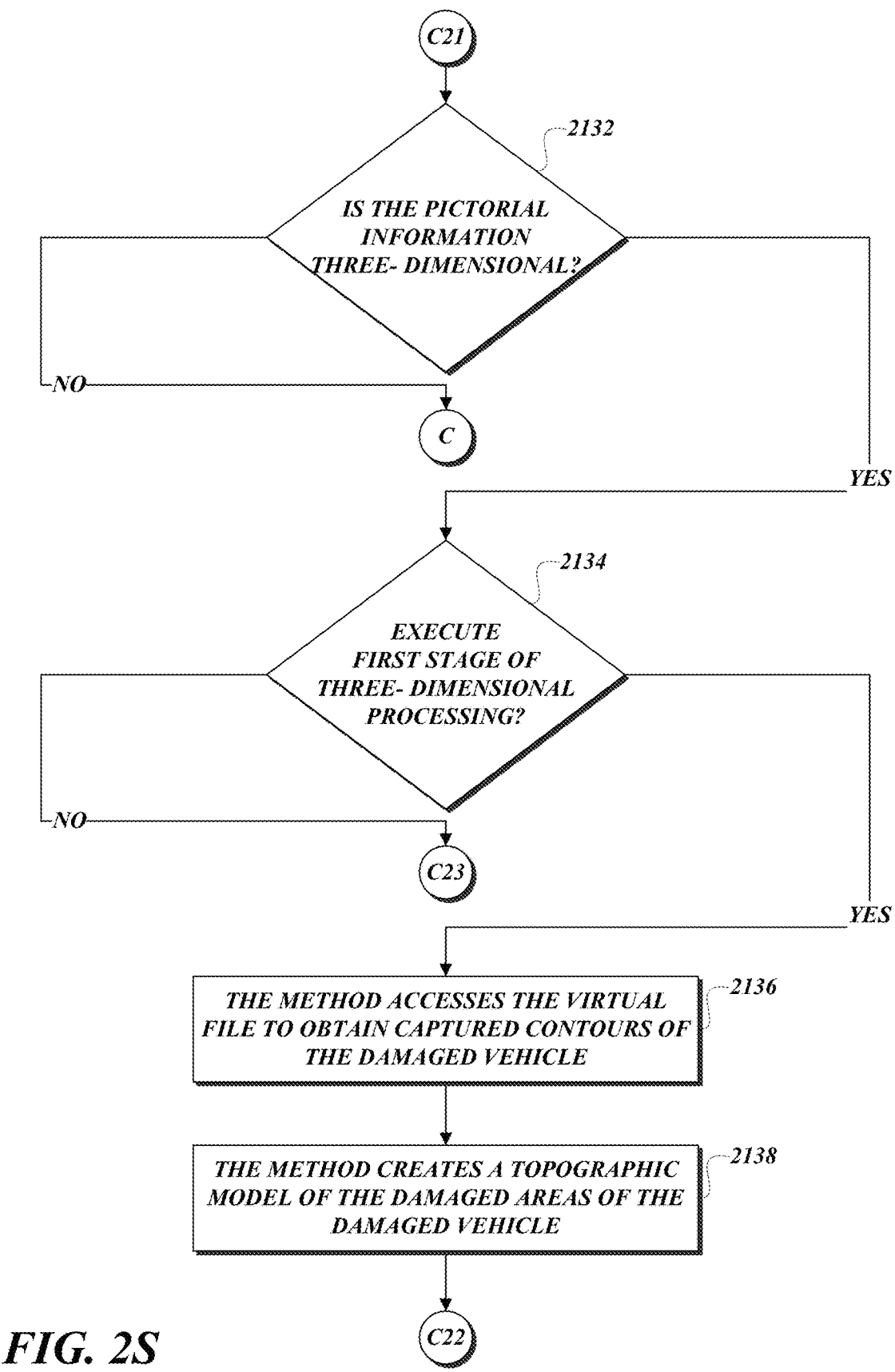

From terminal C21 (FIG. 2S), the method 2000 proceeds to decision block 2132 where a test is performed to determine whether the pictorial information is three dimensional. If the answer to the test at decision block 2132 is NO, the method proceeds to terminal C and skips back to previously discussed processing steps. Otherwise, if the answer to the test at decision block 2132 is YES, the method proceeds to decision block 2134 where a test is performed to determine whether to execute the first state of three-dimensional processing. If the answer to the test at decision block 2134 is NO, the method proceeds to another continuation terminal ("terminal C23"). Otherwise, if the answer to the test at decision block 2134 is YES, the method proceeds to block 2136 where the method accesses the virtual file to obtain captured contours of the damaged vehicle. At block 2138, the method creates a topographic model of the damaged areas of the damaged vehicle. The method then continues to another continuation terminal ("terminal C22").

Figure 2T:
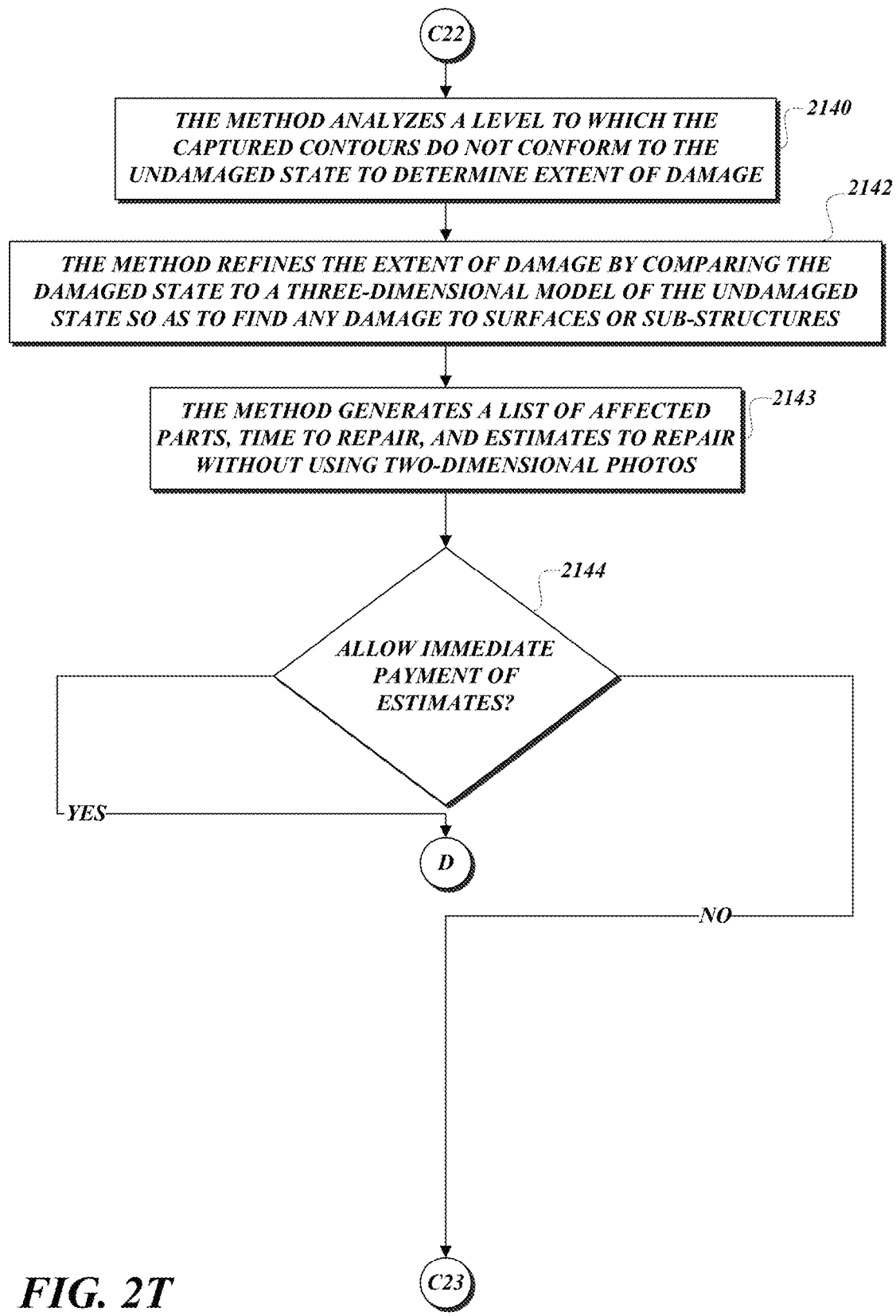

From terminal C22 (FIG. 2T), the method proceeds to block 2140 where the method analyzes a level to which the captured contours do not conform to the undamaged state to determine extent of damage. At block 2142, the method refines the extent of damage by comparing the damaged state to a three-dimensional model of the undamaged state so as to find any damage to surfaces or sub-structures. At block 2143, the method generates a list of affected parts, time to repair, and estimates to repair without using two-dimensional photos. The method then continues to decision block 2144 where a test is performed to determine whether to allow immediate payment of estimates to the claimant. If the answer to the test at decision block 2144 is YES, the method proceeds to terminal D. Otherwise, if the answer to the test at decision block 2144 is NO, the method proceeds to another continuation terminal ("terminal C23").

Figure 2U:
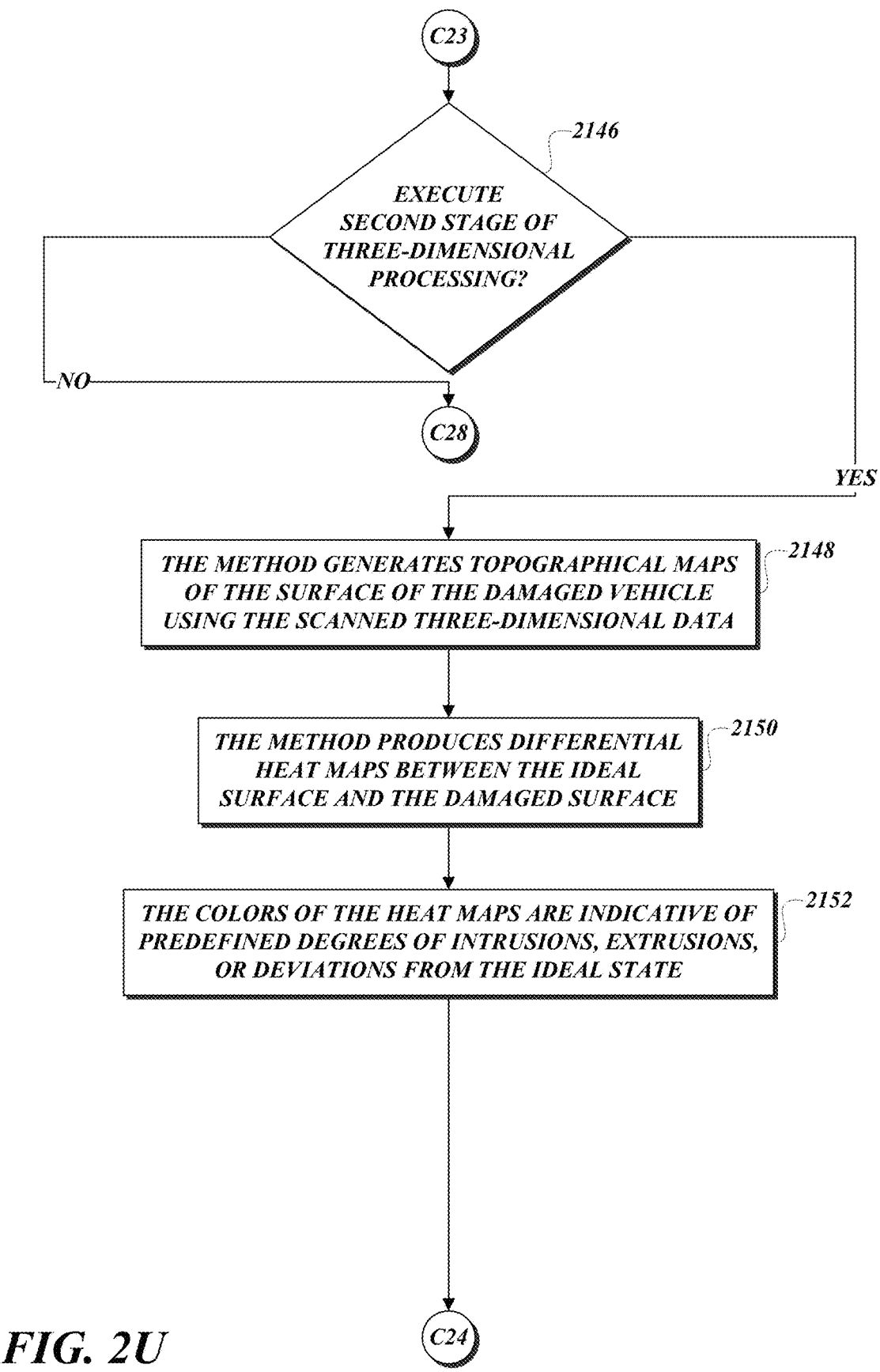

From terminal C23 (FIG. 2U), the method proceeds to decision block 2146 where a test is performed to determine whether to execute the second stage of three-dimensional processing. If the answer to the test at decision block 2146 is NO, the method continues to another continuation terminal ("terminal C28"). Otherwise, if the answer to the test at decision block 2146 is YES, the method proceeds to block 2148 where the method generates topographical maps of the surface of the damaged vehicle using the scanned three-dimensional data. At block 2150, the method produces differential heat maps between the ideal surface and the damaged surface. At block 2152, the colors of the heat maps are indicative of predefined degrees or intrusions, extrusions, or deviations from the ideal state. The method then continues to another continuation terminal ("terminal C24").

Figure 2V:
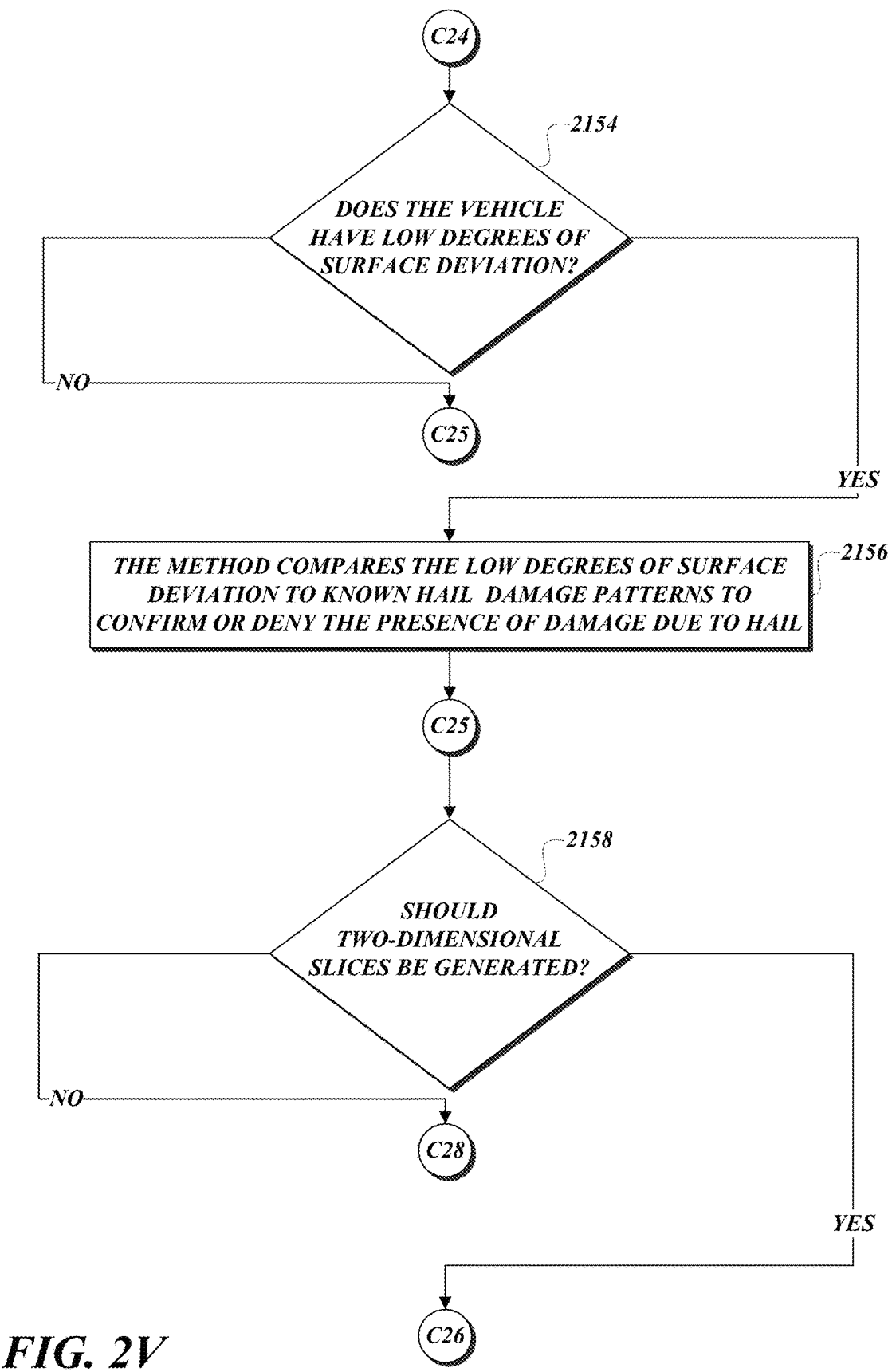

From terminal C24 (FIG. 2V), the method proceeds to decision block 2154 where a test is performed to determine whether the vehicle has low degrees of surface deviation. If the answer to the test at decision block 2154 is NO, the method proceeds to another continuation terminal ("terminal C25"). Otherwise, if the answer to the test at decision block 2154 is YES, the method proceeds to block 2156 where the method compares the low degrees of surface deviation to known hail damage patterns to confirm or deny the presence of damage due to hail. The method then continues to terminal C25. From terminal C25 (FIG. 2V), the method proceeds to decision block 2158 where a test is performed to determine whether two-dimensional slices should be generated. If the answer to the test at decision block 2158 is NO, the method proceeds to another continuation terminal ("terminal C28"). Otherwise, if the answer to the test at decision block 2158 is YES, the method proceeds to another continuation terminal ("terminal C26").

Figure 2W:
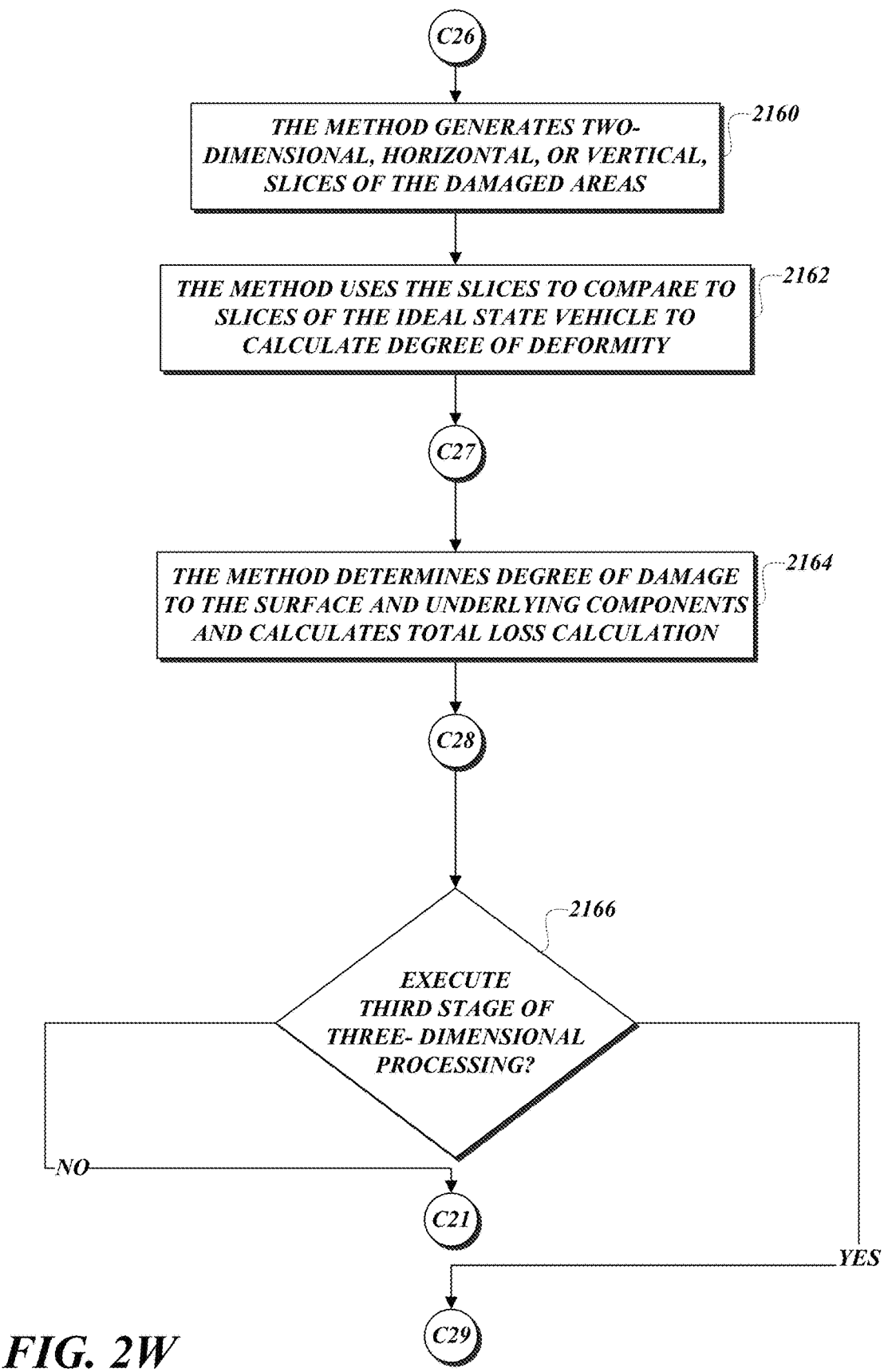

From terminal C26 (FIG. 2W), the method proceeds to block 2160 where the method generates two-dimensional, horizontal or vertical slices of the damaged areas. At block 2162, the method uses the slices to compare to slices of the ideal state vehicle to calculate the degree of deformity. The method then continues to another continuation terminal ("terminal C27"). From terminal C27 (FIG. 2W), the method proceeds to block 2164 where the method determines the degree of damage to the surface and underlying components and performs a total loss calculation. The method then continues to terminal C28. From terminal C28 (FIG. 2W), the method proceeds to decision block 2166 where a test is performed to determine whether to execute the third stage of three-dimensional processing. If the answer to the test at decision block 2166 is NO, the method proceeds to terminal C21 and skips back to previously discussed processing steps. Otherwise, if the answer to the test at decision block 2166 is YES, the method proceeds to another continuation terminal ("terminal C29").

Figure 2X:
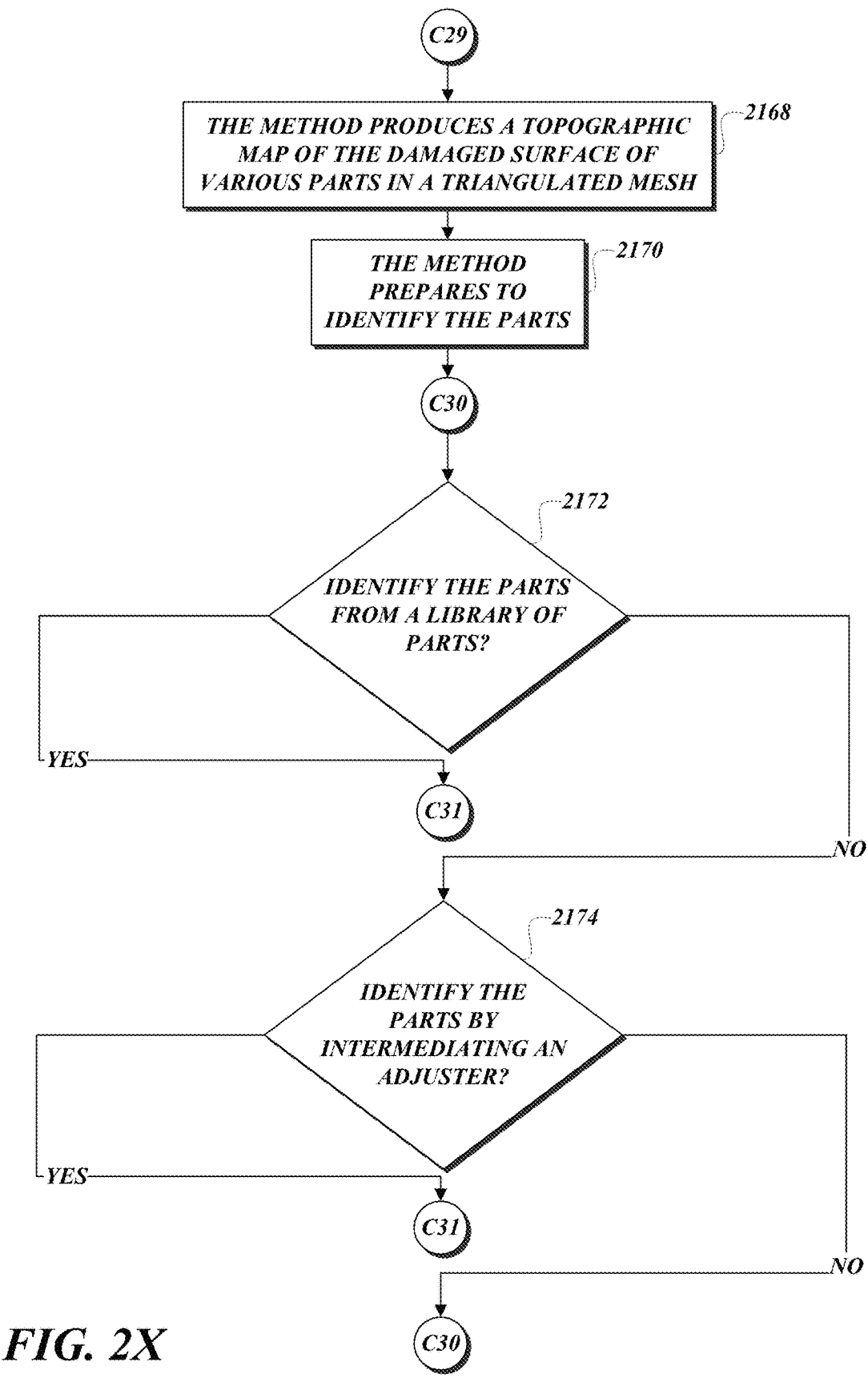

From terminal C29 (FIG. 2X), the method proceeds to block 2168 where the method produces a topographic map of the damaged surfaces of various parts in a triangulated mesh. At block 2170, the method prepares to identify the parts. The method then continues to another continuation terminal ("terminal C30"). From terminal C30 (FIG. 2X), the method proceeds to decision block 2172 where a test is performed to determine whether to identify the parts from a library of parts. If the answer to the test at decision block 2172 is YES, the method then continues to another continuation terminal ("terminal C31"). Otherwise, if the answer to the test at decision block 2172 is NO, the method proceeds to decision block 2174 where a test is performed to determine whether to identify the parts by intermediating an adjuster. If the answer to the test at decision block 2174 is YES, the method proceeds to terminal C31. Otherwise, if the answer to the test at decision block 2174 is NO, the method proceeds to terminal C30 and skips back to previously discussed processing steps.

Figure 2Y:
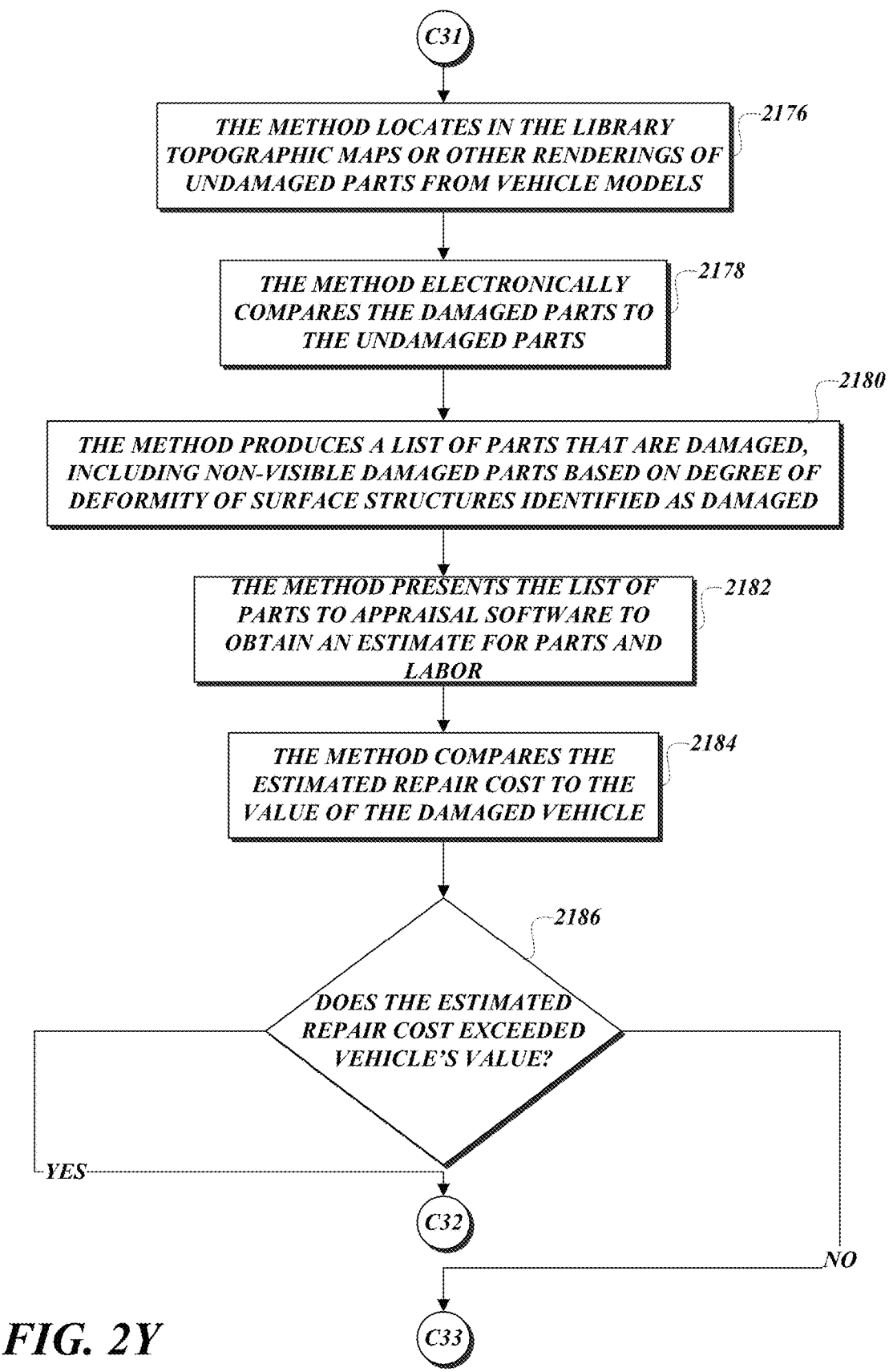

From terminal C31 (FIG. 2Y), the method proceeds to block 2176 where the method locates in the library topographic maps or other renderings of undamaged parts from vehicle models. At block 2178, the method electronically compares the damaged parts to the undamaged parts. At block 2180, the method produces a list of parts that are damaged, including non-visible damaged parts based on the degree of deformity of surface structures identified as damaged. At block 2182, the method presents the list of parts to appraisal software to obtain an estimate for parts and labor. At block 2184, the method compares the estimated repair cost to the value of the damaged vehicle. The method then continues to decision block 2186 where a test is performed to determine whether the estimated repair cost exceeds the vehicle's value. If the answer to the test at decision block 2186 is YES, the method proceeds to another continuation terminal ("terminal C32"). Otherwise, if the answer to the test at decision block 2186 is NO, the method proceeds to another continuation terminal ("terminal C33").

Figure 2Z:
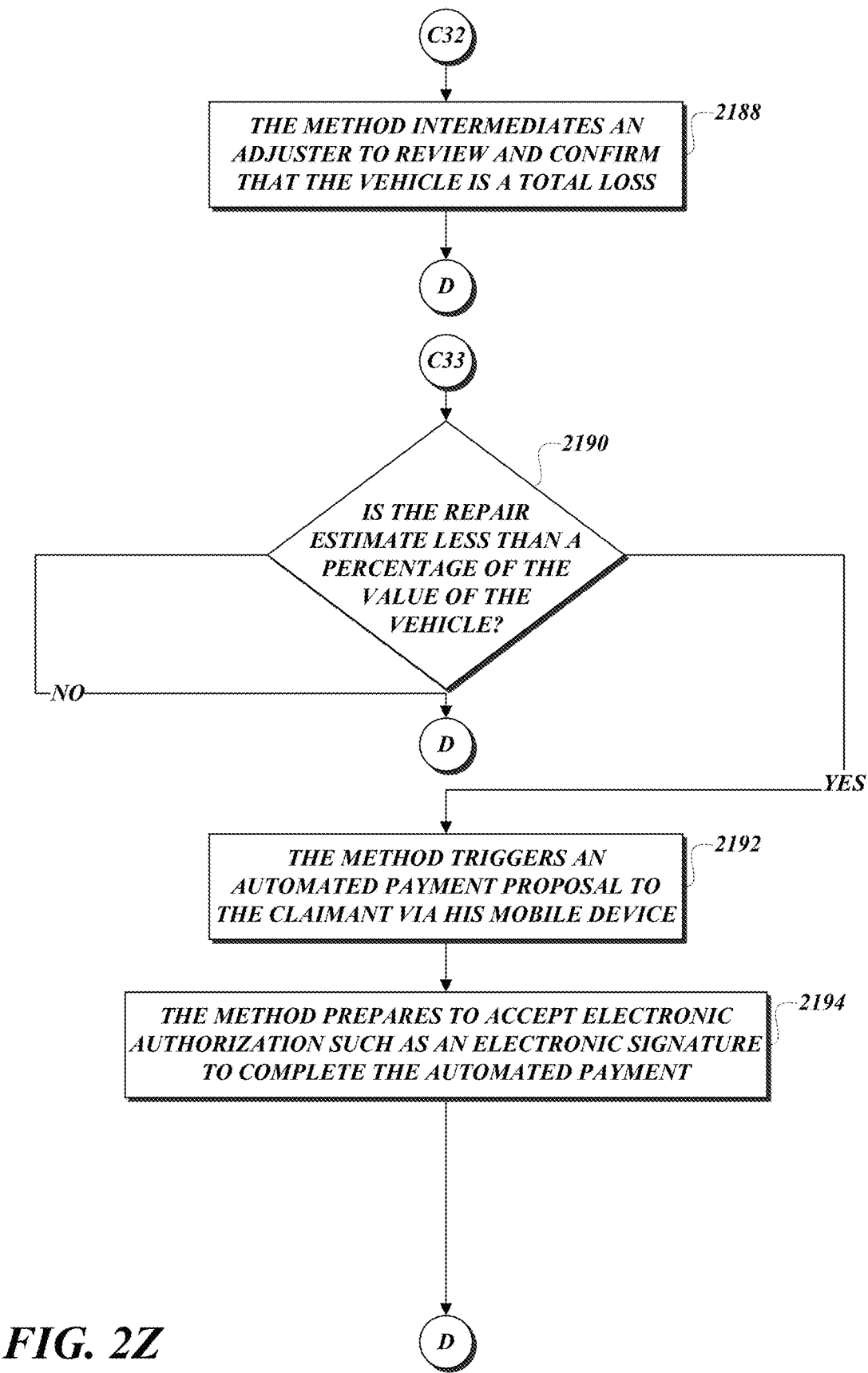
Figure 2A:
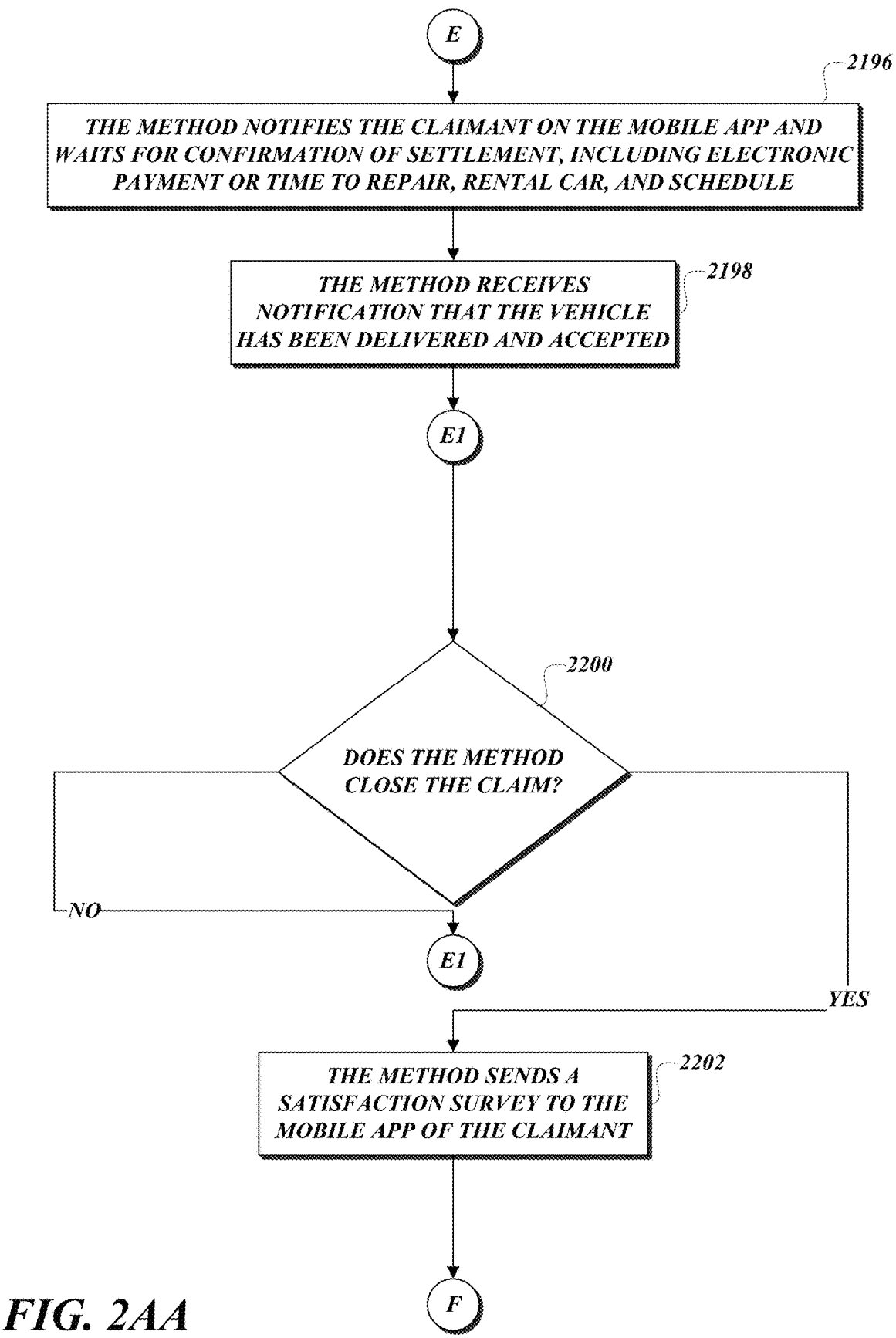

From terminal C32 (FIG. 2Z), the method proceeds to block 2188 where the method intermediates an adjuster (human) to review and confirm that the vehicle is a total loss. The method then continues to terminal D. From terminal C33 (FIG. 2Z), the method 2000 proceeds to decision block 2190 where a test is performed to determine whether the repair estimate is less than a percentage of the value of the vehicle. If the answer to the test at decision block 2190 is NO, the method proceeds to terminal D. Otherwise, if the answer to the test at decision block 2190 is YES, the method proceeds to block 2192 where the method triggers an automated payment proposal to the claimant via his mobile device. At block 2194, the method prepares to accept electronic authorization, such as an electronic signature, to complete the automated payment. The method then continues to terminal D.

From terminal D (FIG. 2A), the method 2000 proceeds to a set of method steps 2006 defined between a continuation terminal ("terminal E") and another continuation terminal ("terminal F"). The set of method steps 2006 prepares to settle the claim and closes the claim. From terminal E (FIG. 2AA), the method proceeds to block 2196 where the method notifies the claimant on the mobile app and waits for confirmation of settlement, including electronic payment or time to repair, rental car, and schedule. At block 2198, the method receives notification that the vehicle has been delivered and accepted. The method then continues to another continuation terminal ("terminal E1"). From terminal E1 (FIG. 2AA), the method proceeds to decision block 2200 where a test is performed to determine whether the method closes the claim. If the answer to the test at decision block 2200 is NO, the method proceeds to terminal E1 and skips back to previously discussed processing steps. Otherwise, if the answer to the test at decision block 2200 is YES, the method proceeds to block 2202 where the method sends a satisfaction survey to the mobile app of the claimant and closes the claim. The method then continues to terminal F and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method comprising:
   projecting light pattern on a damaged vehicle to reveal deformation of the pattern;
   offsetting from the light pattern, obtaining a shape of the pattern by a camera;
   calculating, from the shape, distance of every point in the field of view;
   determining using structured-light calculation contours of the damaged vehicle; and
   creating differential heat maps to detect degrees of intrusion, extrusion, or deviation from the undamaged vehicle.

2. The method of claim 1, further comprising creating a topographic model of the damaged vehicle so as to compare the damaged vehicle to a three-dimensional model of an undamaged vehicle to determine extent of the damage to surface and sub-structures.

3. The method of claim 1, further comprising immediate electronic payment of a claim estimate to a claimant based on the extent of the damage.

4. The method of claim 1, wherein determining occurs without using photographic images to determine the extent of the damage.

5. The method of claim 1, further comprising generating two-dimensional horizontal or vertical slices of the damaged vehicle so as to compare the two-dimensional horizontal or vertical slices of the damaged vehicle to two-dimensional horizontal or vertical slices of an undamaged vehicle to gauge deformity to underlying components.

6. The method of claim 1, wherein further comprising detecting damage of the damaged vehicle in cases in which the damaged vehicle has a light color.

7. The method of claim 1, further comprising detecting damage of the damaged vehicle in cases in which the damaged vehicle has low degrees of surface deviation.

8. The method of claim 1, further comprising negating a need to position reference points to be placed on the surface of the damaged vehicle.

9. A method comprising:
   projecting light pattern on a damaged vehicle to reveal deformation of the pattern;
   offsetting from the light pattern, obtaining a shape of the pattern by a camera;
   calculating, from the shape, distance of every point in the field of view;
   determining using structured-light calculation contours of the damaged vehicle; and
   generating two-dimensional horizontal or vertical slices of the damaged vehicle so as to compare the two-dimensional horizontal or vertical slices of the damaged vehicle to two-dimensional horizontal or vertical slices of an undamaged vehicle to gauge deformity to underlying components.

10. The method of claim 9, further comprising creating a topographic model of the damaged vehicle so as to compare the damaged vehicle to a three-dimensional model of an undamaged vehicle to determine extent of the damage to surface and sub-structures.

11. The method of claim 9, further comprising immediate electronic payment of a claim estimate to a claimant based on the extent of the damage.

12. The method of claim 9, wherein determining occurs without using photographic images to determine the extent of the damage.

13. The method of claim 9, further comprising creating differential heat maps to detect degrees of intrusion, extrusion, or deviation from an undamaged vehicle.

14. The method of claim 9, wherein further comprising detecting damage of the damaged vehicle in cases in which the damaged vehicle has a light color.

15. The method of claim 9, further comprising detecting damage of the damaged vehicle in cases in which the damaged vehicle has low degrees of surface deviation.

16. The method of claim 9, further comprising negating a need to position reference points to be placed on the surface of the damaged vehicle.

* * * * *